United States Patent
Xiao et al.

(10) Patent No.: US 8,131,063 B2
(45) Date of Patent: Mar. 6, 2012

(54) MODEL-BASED OBJECT IMAGE PROCESSING

(75) Inventors: Jing Xiao, Cupertino, CA (US); Derek Shiell, Palo Alto, CA (US)

(73) Assignee: Seiko Epson Corporation, Tokyo (JP)

( * ) Notice: Subject to any disclaimer, the term of this patent is extended or adjusted under 35 U.S.C. 154(b) by 592 days.

(21) Appl. No.: 12/392,808

(22) Filed: Feb. 25, 2009

(65) Prior Publication Data

US 2010/0013832 A1    Jan. 21, 2010

Related U.S. Application Data

(60) Provisional application No. 61/081,307, filed on Jul. 16, 2008.

(51) Int. Cl.
*G06K 9/00* (2006.01)
*G06T 17/00* (2006.01)
*G06F 19/00* (2011.01)

(52) U.S. Cl. ............... 382/154; 345/420; 700/98

(58) Field of Classification Search .......... 382/118, 382/154, 276, 285; 345/6, 419, 420, 422, 345/427, 621, 630, 653, 654, 664; 700/98, 700/163, 182; 702/152, 153; 715/225, 771, 715/852, 964, 970
See application file for complete search history.

(56) References Cited

U.S. PATENT DOCUMENTS

| | | | |
|---|---|---|---|
| 5,710,833 A | 1/1998 | Moghaddam et al. | |
| 5,933,150 A | 8/1999 | Ngo et al. | |
| 6,044,168 A | 3/2000 | Tuceryan et al. | |
| 6,556,196 B1 * | 4/2003 | Blanz et al. | 345/419 |
| 6,760,488 B1 | 7/2004 | Moura et al. | |
| 6,850,872 B1 | 2/2005 | Marschner et al. | |
| 6,876,755 B1 | 4/2005 | Taylor et al. | |
| 6,965,684 B2 | 11/2005 | Chen et al. | |
| 7,006,102 B2 | 2/2006 | Rowe | |
| 7,006,683 B2 * | 2/2006 | Brand | 382/154 |
| 7,046,826 B2 | 5/2006 | Toyama | |
| 7,054,468 B2 | 5/2006 | Yang | |
| 7,079,680 B2 * | 7/2006 | Baumberg | 382/154 |
| 7,095,879 B2 | 8/2006 | Yan et al. | |
| 7,133,540 B2 | 11/2006 | Liu et al. | |
| 7,142,726 B2 * | 11/2006 | Ziegler et al. | 382/285 |
| 7,171,029 B2 | 1/2007 | Rowe | |

(Continued)

FOREIGN PATENT DOCUMENTS

EP    1 424 655 A2    6/2004

(Continued)

OTHER PUBLICATIONS

V. Blanz, et al., "A Morphable Model for the Synthesis of 3D Faces," SIGGRAPH'99 Conference Proceedings, pp. 187-194, 1999.

(Continued)

*Primary Examiner* — Abolfazl Tabatabai

(57) ABSTRACT

Aspects of the present invention include systems and methods for forming generative models, for utilizing those models, or both. In embodiments, an object model fitting system can be developed comprising a 3D active appearance model (AAM) model. The 3D AAM comprises an appearance model comprising a set of subcomponent appearance models that is constrained by a 3D shape model. In embodiments, the 3D AAM may be generated using a balanced set of training images. The object model fitting system may further comprise one or more manifold constraints, one or more weighting factors, or both. Applications of the present invention include, but are not limited to, modeling and/or fitting face images, although the teachings of the present invention can be applied to modeling/fitting other objects.

21 Claims, 26 Drawing Sheets

U.S. PATENT DOCUMENTS

| | | | |
|---|---|---|---|
| 7,181,051 B2 | 2/2007 | Liu et al. | |
| 7,212,664 B2 * | 5/2007 | Lee et al. | 382/154 |
| 7,218,774 B2 * | 5/2007 | Liu | 382/154 |
| 7,272,243 B2 | 9/2007 | Toyama | |
| 7,289,648 B2 | 10/2007 | Liu | |
| 7,305,369 B2 | 12/2007 | Littlefield et al. | |
| 7,321,670 B2 | 1/2008 | Yoon et al. | |
| 7,324,671 B2 | 1/2008 | Li et al. | |
| 7,336,830 B2 | 2/2008 | Porter et al. | |
| 7,355,607 B2 | 4/2008 | Harvill | |
| 7,372,981 B2 | 5/2008 | Lai et al. | |
| 2006/0176301 A1 | 8/2006 | Sohn et al. | |
| 2007/0098294 A1 | 5/2007 | Xu et al. | |
| 2007/0154096 A1 | 7/2007 | Cao et al. | |
| 2007/0172099 A1 | 7/2007 | Park et al. | |
| 2007/0226624 A1 | 9/2007 | Peker et al. | |
| 2008/0031493 A1 | 2/2008 | Brogren et al. | |
| 2008/0031498 A1 | 2/2008 | Corcoran et al. | |
| 2008/0107341 A1 | 5/2008 | Lu | |
| 2008/0152200 A1 | 6/2008 | Medioni et al. | |
| 2008/0152213 A1 | 6/2008 | Medioni et al. | |

FOREIGN PATENT DOCUMENTS

| | | |
|---|---|---|
| WO | WO 2007/044815 A2 | 4/2007 |
| WO | WO 2008/018887 A1 | 2/2008 |

OTHER PUBLICATIONS

R. Gross, et al., "Active Appearance Models with Occlusion," Appeared in Image and Vision Computing, vol. 24, No. 6, 2006.

S. Flory, et al., "Constrained Curve Fitting on Manifolds" vol. 40, Issue 1, The Guide to Computing Literature, Sep. 11, 2008.

S. K. Zhou, et al., "Characterization of human faces under illumination variations using rank, integrability, and symmetry constraints," European Conference on Computer Vision (ECCV), Prague, Czech Republic, May 10, 2004.

J. Xiao, et al., "Robust Full-Motion Recovery of Head by Dynamic Templates and Re-registration Techniques," The 5th IEEE International Conference on Automatic Face and Gesture Recognition (FG), pp. 156-162, May 2002.

J. Xiao, et al., "A Closed-Form Solution to Non-rigid Shape and Motion Recovery," The 8th European Conference on Computer Vision (ECCV), pp. 573-587, 2004.

J. Xiao, et al., "Real-Time Combined 2D+3D Active Appearance Models," IEEE International Conference on Computer Vision and Pattern Recognition (CVPR), pp. 535-542, 2004.

* cited by examiner

No Manifold
Constraints
910

Manifold
Constraints
920

1500

Using a training set of object images, generate an object 3D shape model and an object appearance model that is based on a set of object subcomponent models ⟋1505

↓

Generate an object model fitting system comprising an object model comprising the object appearance model constrained by the object 3D shape model ⟋1510

Given a parameter vector, find the nearest manifold cluster center for shape and appearance — 2505

↓

Apply a constraint to parameter updates based on the distance to the nearest cluster center — 2510

FIGURE 25

MODEL-BASED OBJECT IMAGE PROCESSING

CROSS REFERENCE TO RELATED APPLICATIONS

This application is related to the following concurrently filed, co-pending, and commonly assigned applications: U.S. application Ser. No. 12/392,820, filed Feb. 25, 2009, entitled "Iterative Data Reweighting for Balanced Model Learning," listing Jing Xiao and Derek Shiell as inventors; U.S. application Ser. No. 12/392,828, filed Feb. 25, 2009, entitled "Combining Subcomponent Models for Object Image Modeling," listing Jing Xiao and Derek Shiell as inventors; U.S. application Ser. No. 12/392,840, filed Feb. 25, 2009, entitled "Subdivision Weighting for Robust Object Model Fitting," listing Jing Xiao and Derek Shiell as inventors; and U.S. application Ser. No. 12/392,849, filed Feb. 25, 2009, entitled "Improving Object Model Fitting Using Manifold Constraints," listing Derek Shiell and Jing Xiao as inventors. Each of the above-referenced applications is incorporated herein by reference in its entirety. This application claims the benefit of priority on U.S. Provisional Application No. 61/081,307 filed Jul. 16, 2008 under 35 U.S.C. §119(e).

BACKGROUND

A. Technical Field

The present invention pertains generally to image processing, and relates more particularly to model-based image processing.

B. Background of the Invention

Emerging communications trends point to streaming video as a new form of content delivery. These systems are implemented over wired systems, such as cable and wireless networks, such as wireless Internet and cell phones. These communications systems require sophisticated methods of compression and error-resilience encoding to enable communications across bandwidth-limited and noisy delivery channels. Additionally, the transmitted video data must be of high enough quality to ensure a satisfactory end-user experience.

Traditionally, video compression makes use of temporal and spatial coherence to reduce the information required to represent an image. In many communications systems, the communication channel is characterized by a probabilistic model, which describes the capacity or fidelity of the channel.

In many communication scenarios, such as online conferencing, human face images comprise a large percentage of the visual data. A good understanding of human face images is important in order to achieve good performance on such applications such as, for example, enhancing the display quality or recovering image errors due to missing data or compression effects in the video streams.

SUMMARY OF THE INVENTION

Aspects of the present invention include systems and methods for generating models and/or for utilizing those models. Applications of the present invention include, but are not limited to, its use in embodiments of systems and methods for modeling face images. Embodiments of the present invention employ a 3D active appearance model (AAM) face model comprising an appearance model formed from the combination of a set of appearance models of facial subcomponents and a global 3D shape model that constrains the appearance model. Although embodiments of the present invention are described with respect to modeling faces, it shall be understood that the present invention may be applied to modeling and/or fitting other items beside faces.

In embodiments, a three-dimensional (3D) active appearance model (AAM) face model that is based on a combination of a set of appearance models of facial subcomponents and a 3D shape model may be generated using a training data set of face images. In embodiments, an object model fitting system comprising a 3D AAM may be generated.

In embodiments, a set of features or control points for an image may be identified and assigned labels. In embodiments, the labeled set of control points may provide the basis for subdividing a face image into a mesh comprising a set of triangular regions. In embodiments, a set of meshes may be generated based on the training data set of face images.

In embodiments, a set of 2D shape models may be generated based on the set of meshes. In embodiments, a set of reconstructed 3D shape modes may be generated for each of the object images in the training data set by applying factorization, such as a non-rigid structure from motion (NRSFM) method, to the set of 2D shape models. In embodiments, at least one symmetry constraint, such as, by way of example, a symmetry constraint associated with 3D depth, may be applied when generating the 3D shapes.

In embodiments, a face appearance model comprising a set of face subcomponent appearance models may be derived from the training data set of face images. In embodiments, the triangular regions of 2D face images may be grouped into larger regions representing facial subcomponents. An appearance model of each facial subcomponent may be derived from the training data set of face images by extracting a set of linear texture bases capable of representing each subcomponent in the training data set of face images. In embodiments, the orthogonal texture bases are extracted using Principal Component Analysis (PCA). In embodiments, the set of subcomponent models may also include comprise an appearance model of the global face image.

In embodiments, a comprehensive 3D AAM face model comprises a set of subcomponent image appearance models that are constrained by a global 3D shape model.

In embodiments, shape and/or appearance models may be improved by correcting training data set imbalances. In embodiments, an unbalanced training data set of face images may be balanced based on identifying face images associated with fitting errors that are greater than a threshold. In embodiments, an unbalanced training data set may be balanced either by adding more of the types of face images having greater fitting errors (and increasing the size of the data set), or by weighting the face images having greater fitting errors (and keeping the size of the data set constant).

In embodiments, shape and/or texture manifolds are generated based on shape and/or texture parameter vectors generated by fitting the object images in the training data set to generated shape and/or appearance models. In embodiments, an object model fitting system comprising a 3D AAM and a set of manifold constraints based on one or more manifolds may be generated.

In embodiments, a reconstructed object image may be formed by fitting an input object image to an object model using an object model fitting system comprising a 3D AAM comprising a 3D shape model and an appearance model comprising a set of subcomponent appearance models by iteratively performing steps that may comprise forming a projected input object image by projecting a current 3D shape and pose estimate onto the input object image and forming a current reconstructed object appearance estimate of the projected input object image warped to a canonical view. A fitting error representing a difference between the current reconstructed object appearance estimate and a current object appearance model estimate is determined. Responsive to a stop condition not being met, the fitting error is used to form an updated current 3D shape and pose estimate by updating 3D shape parameter values and pose parameter values and to form an updated current object appearance model estimate by updating appearance parameters. Responsive to a stop condition being satisfied, the current object appearance model estimate is designed as the reconstructed object image. In embodiments, the input object image is a face image and the 3D AAM is a face model. In embodiments, fitting the image to the 3D AAM may be performed by an inverse compositional method.

In embodiments, the object model fitting system comprises one or more weighting factors, and the fitting can be made more robust by including weighting factors associated with regions of pixels, which may be one pixel or groups of pixels. Robust fitting may comprise updating of weighting values associated with parameters. In embodiments, robust fitting based on registration error may be implemented by applying a weighting matrix to features of pixels, regions of pixels, and/or subcomponent regions. In embodiments, pose-based pixel weighting may be applied so that higher weights are given to those portions of the image that most directly facing the camera and/or to give lower weights to pixels to pixels with oblique camera angles.

In embodiments, the object model fitting system may comprise a 3D AAM and manifold constraints that may be applied during fitting. In embodiments, applying a shape and/or appearance manifold may comprise determining a parameter value distance to a cluster center in a shape and/or appearance manifold.

In embodiments, a system for forming a reconstructed object image from an input object image may comprise an object model fitter that receives the input object image and forms the reconstructed object image by fitting the input object image to a 3D AAM using an object model fitting system. In embodiments, the 3D AAM comprises a 3D shape model and an object appearance model comprising a set of object subcomponent appearance models. In embodiments, the input object image is a face image and the 3D AAM is a face model. In embodiments, the object model fitter comprises a reconstructed object estimator that receives the input object image and the 3D AAM and generates a reconstructed object estimate, and that receives updates to the 3D shape parameter values, pose parameter values, and texture parameter values associated with a current reconstructed object appearance estimate and a current object appearance model estimate. In embodiments, the object model fitter also includes a reconstructed object updater that receives the current reconstructed object appearance estimate and the current object appearance model estimate, and that calculates updates to the 3D shape parameter values, the pose parameter values, and the texture parameter values. In embodiments, the object model fitter includes robust weighting as part of the fitting process. In embodiments, the object model includes one or more manifold constraints, which are used to constrain updates to one or more parameters.

In embodiments, the system may further comprise an object model builder that forms the object model fitting system comprising the 3D AAM based on the set of training object images. In embodiments, the object model builder comprises a 3D shape reconstructor and modeler that receives 2D shapes of the set of training object images and forms a 3D shape model based on the 2D shapes, and a subcomponent appearance modeler that forms a set of object subcomponent appearance models based upon the set of training object images. In embodiments, the object model builder may further comprise a model balancer that balances a training data set of object images based on identifying object images associated with fitting errors that are greater than a threshold. In embodiments, the object model builder may further comprise a manifold builder that generates shape and/or texture manifolds based on shape and/or texture parameter vectors generated by fitting the object images in the training data set to generated shape and/or appearance models.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 15 depicts a first embodiment of a method for generating an object model according to various embodiments of the invention.

FIG. 25 depicts a method for applying a manifold constraint according to various embodiments of the invention.

DETAILED DESCRIPTION OF THE PREFERRED EMBODIMENTS

Figure 1:
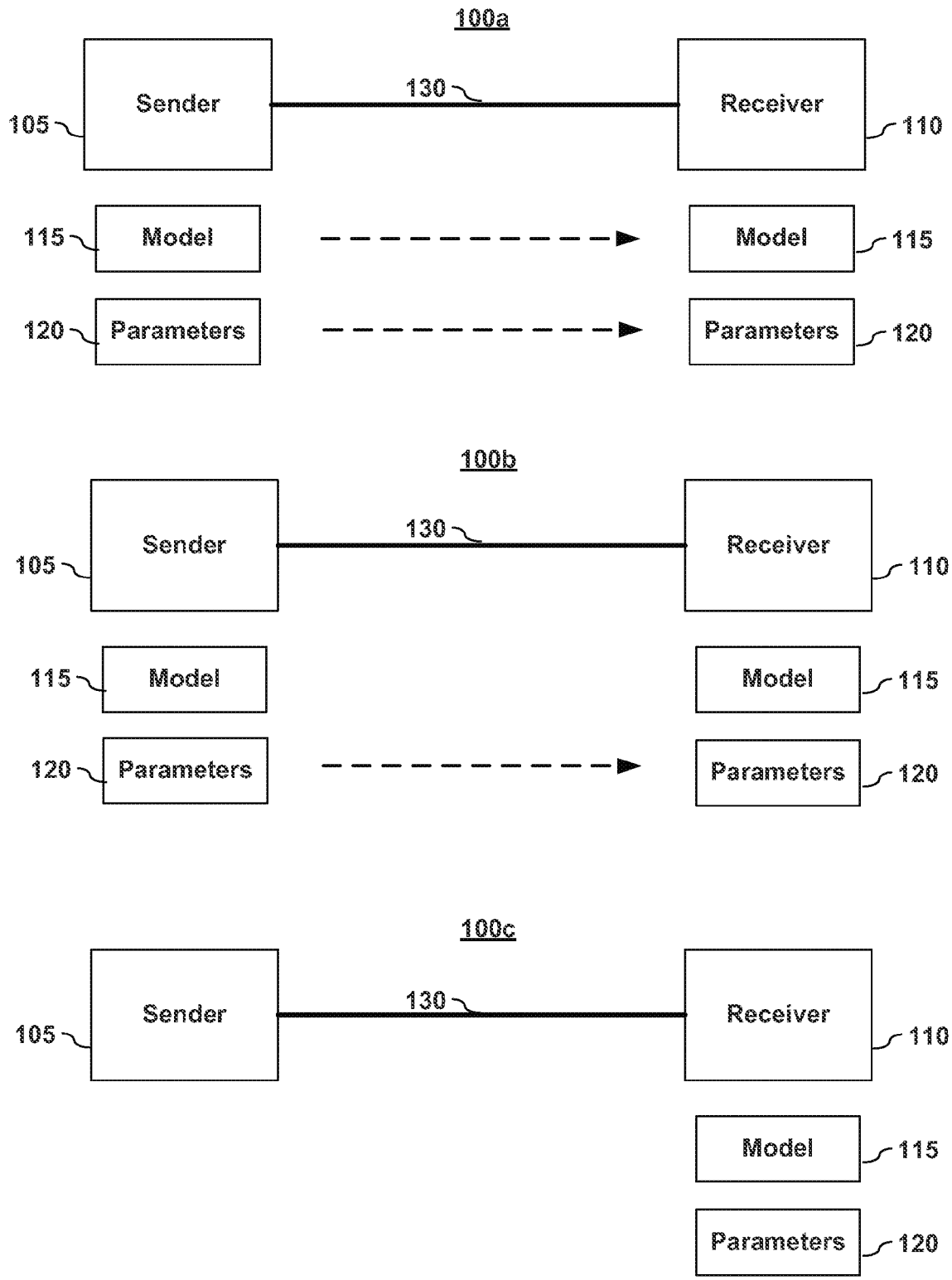
FIG. 1 illustrates exemplary video communication systems according to various embodiments of the invention.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different systems and devices including cameras, scanners, printers, computers, facsimile machine, mobile devices, including those devices with a display or camera capabilities, multimedia devices, and the like. The embodiments of the present invention may be implemented in software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that the various components, or portions thereof, may be divided into separate components or may be integrated together, including integrated within a single system or component.

Furthermore, connections between components/modules within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "an embodiment," or "embodiments," means that a particular feature, structure, characteristic, or function described in connection with the embodiment or embodiments is included in at least one embodiment of the invention and may be in more than one embodiment. The appearances of the phrase "in one embodiment," or "in an embodiment," or "in embodiments," in various places in the specification are not necessarily all referring to the same embodiment or embodiments.

A. Overview

One specific application of the present invention is its use in embodiments of face modeling systems for face image understanding and processing. One skilled in the art shall recognize the general applicability of the present invention to modeling generally and to processing of object images other than face images.

Understanding human face images is important in visual communication systems. Key tasks in understanding human face images involve the preservation of facial expressions and their evolution. The alignment of facial features (such as, for example, eye corners, face side, and lip contours) often is an important component of such tasks. Facial features may be used for enhancing or reconstructing detailed facial appearance, and also may be used for estimating the three-dimensional (3D) face shapes and poses that comprise face image analysis and adjustment (e.g., adjusting for self-occlusion, warping across poses for gaze correction, and un-distorting the perspective effects).

Traditional image filtering methods for image sharpening or enhancement are not optimal solutions for human face image understanding tasks because these methods do not take into account the inherent properties of the human face shapes and appearance. Recently, model-based methods have been proposed for understanding human face images. One model-based method that is widely used for face image analysis is based on a two-dimensional (2D) Active Appearance Model (AAM). An AAM is a statistical model usually learned from a database of face images covering different properties of interest (e.g., different identities, different viewing angles, different lighting conditions, and different expressions). An AAM is a type of deformable model that typically consists of two individual statistical models, one covering the appearance variation and another covering the shape deformation. An AAM may be used to simultaneously describe the typical shape and appearance variations (deformations) across human faces by training the model on a set of many face images exemplifying those variations (deformations).

A model-based method for modeling facial appearance variations and 3D shape deformations may be based on a three-dimensional (3D) Morphable Model. The 3D Morphable Model is a statistical model that is typically learned from dense 3D scanned facial data under various situations. A more efficient model-based method may be based on a 2D+3D AAM, which uses the same sparse set of control points on the face that define a 2D AAM, but the 2D+3D AAM can model both 2D and 3D face shape deformations simultaneously. This type of model enables estimation of 3D face poses, reconstruction of detailed facial deformations, and may also enable handling of other factors such as, for example, self-occlusions.

The previously described models typically are global models that consider the variations of all the pixels on the face simultaneously. A global model ensures the stability of the relationships among the components in alignment and reconstruction by providing a global constraint on image variance of the facial components. However, a global constraint may limit the flexibility of the model. Since statistical face models are usually developed by applying Principal Component Analysis (PCA) to a set of training face images and keeping the most dominant modes, some significant variations of small facial components, such as, for example, eyes and mouth, are often considered to be subtle variations in the global models and thus abandoned. As a result, the global models often lose these subtle but important details in the reconstructed face images.

Embodiments of the present invention employ a 3D AAM face model that is based on a combination of a set of individual appearance models of facial subcomponents and that has shape deformations constrained by a global 3D shape model. The set of individual appearance models ensures increased model flexibility for reconstruction of detailed face image variations while the global shape constraint ensures the structural stability of the facial components.

One application of using such a model is in video communications, as illustrated in FIG. 1. A video communications system may comprise a sender 105 that transmits a video stream of face images across a channel 130 to a receiver 110. The received video stream may contain missing data, and/or it may contain artifacts such as, for example, compression artifacts. In a first embodiment 100a, the receiver 110 may perform face reconstruction based on a model 115 and parameters 120 (e.g., shape parameters and texture parameters) that may be transmitted through the video stream. In alternate embodiments 100b, the model 115 may be shared by both the sender 105 and the receiver 110, so that face reconstruction by the receiver 110 is based only on transmitted parameters 120. In yet other alternate embodiments 100c, the receiver 110 may fit an AAM to each received frame in order to detect faces and reconstruct face images without any model 115 or parameters 120 being transmitted.

B. System Implementations

Figure 2:
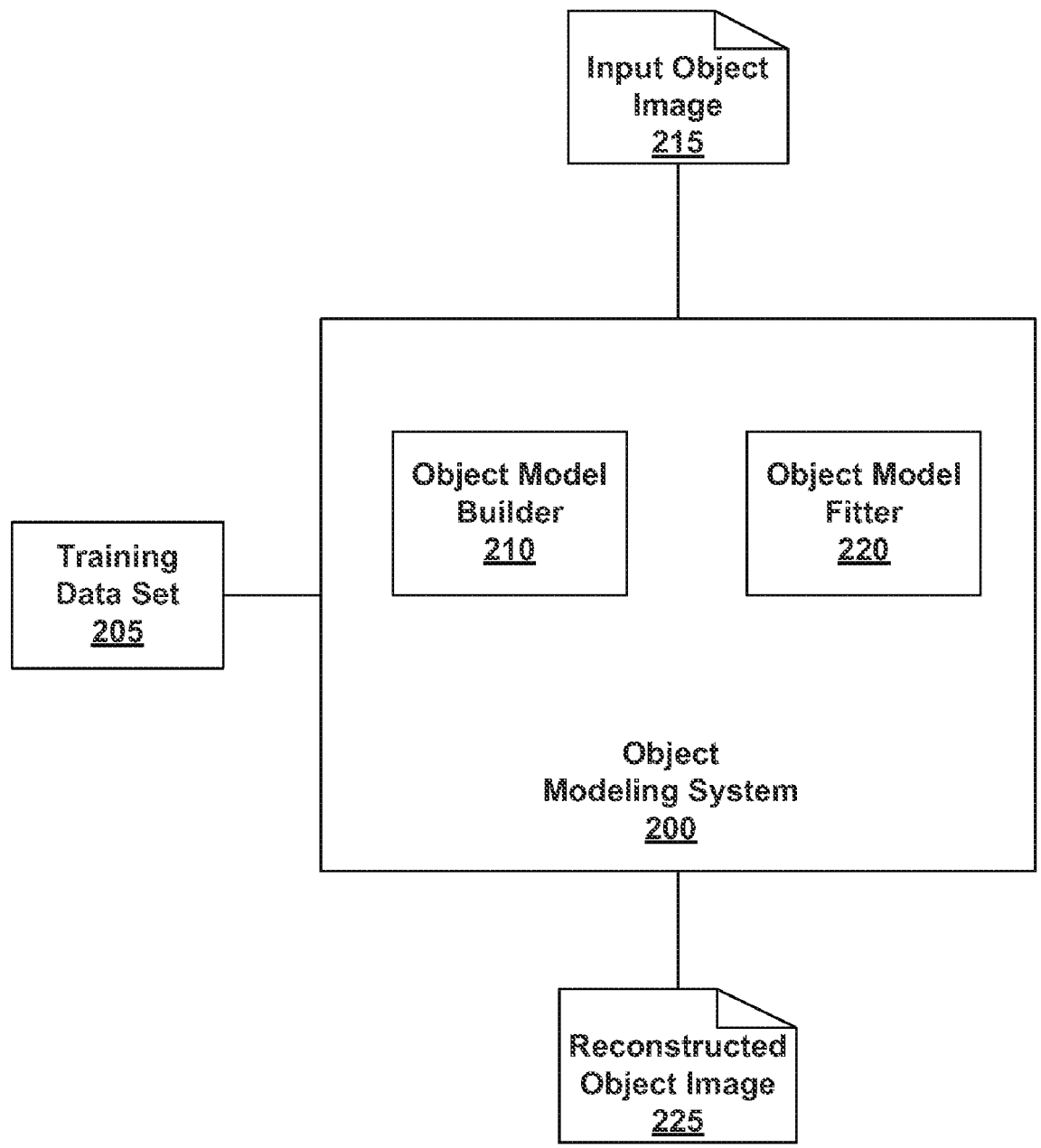
FIG. 2 depicts a block diagram of an object modeling system according to various embodiments of the invention.

FIG. 2 illustrates an object modeling system 200 according to various embodiments of the invention. Object modeling system 200 comprises an object model builder 210 that constructs an object model from a training data set of object images 205, and an object model fitter 220 that generates a reconstructed object image 225 by fitting an input object image 215 to a generated object model. In embodiments, object modeling system 200 may be a face modeling system, and the reconstructed face 225 may be used for any of a number of purposes, including, without limitation, to detect input face image 215 features such as, for example, shapes, poses, eyes, mouth, etc.

1. Object Model Builder Implementations

The following sections describe various embodiments of implementations of an object model builder 210 that generates an object model fitting system 345 based on a training data set of object images 205.

a) A First Embodiment of an Object Model Builder Implementation

Figure 3:
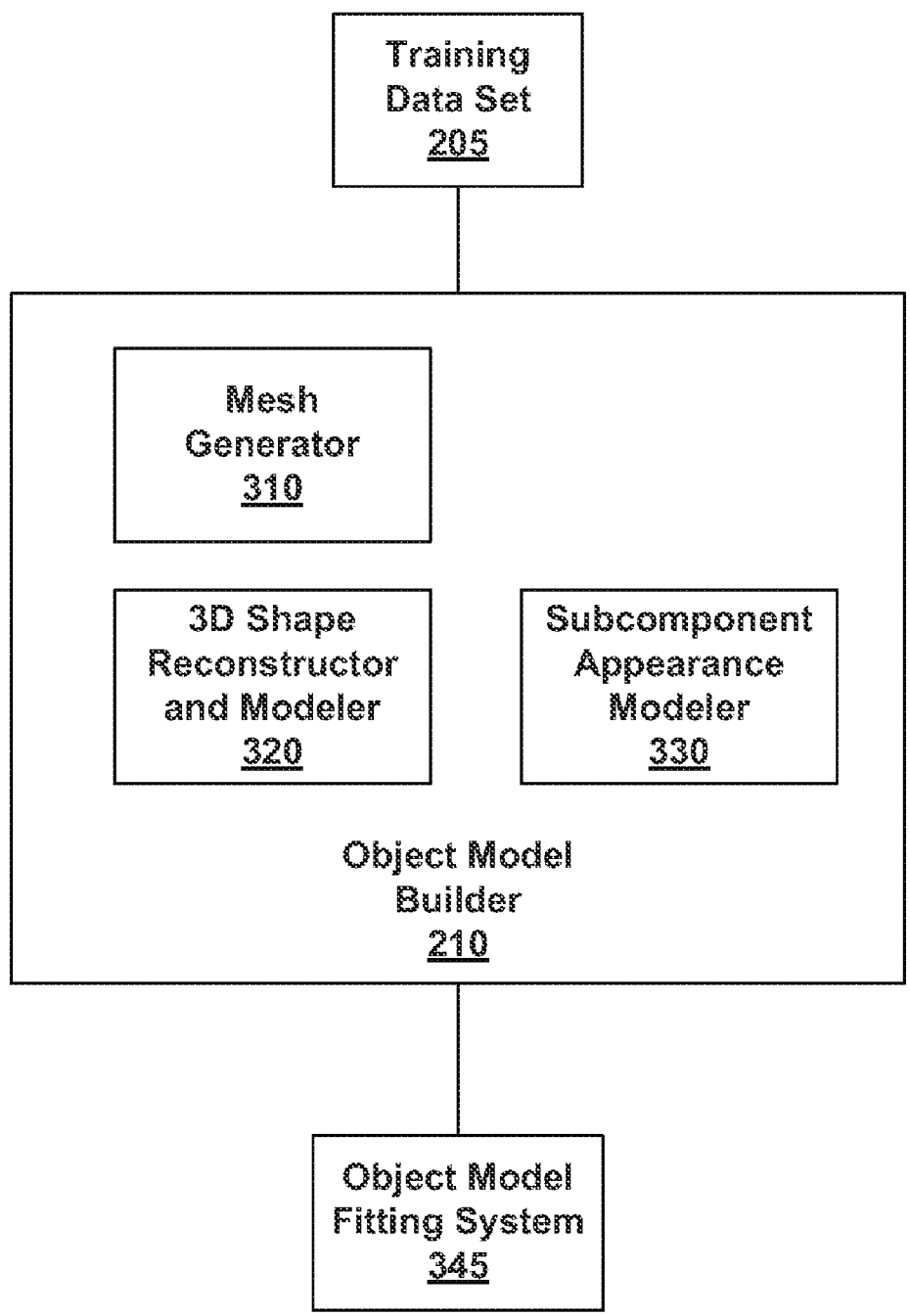
FIG. 3 depicts a block diagram of a first embodiment of an object model builder according to various embodiments of the invention.

FIG. 3 depicts a first embodiment of object model builder 210 that comprises mesh generator 310, 3D shape reconstructor and modeler 320, and subcomponent appearance modeler 330.

In embodiments, object model builder 210 may be a face model builder, a training data set 205 may comprise face images, and a set of features or control points may be identified and labeled in each face image within the training data set 205. In embodiments, the set of control points for an image may be previously identified and assigned labels or may be identified and assigned labels by a user. Groups of these control points may correspond to facial components such as, for example, eyes, brows, nose, mouth, and face sides. In embodiments, at least a subset of the control points may be used to represent a 2D shape of a face image. Registration of the 2D face shapes (alignment of images to compensate for camera movement) within the training data set 205 may eliminate the rigid transformation and preserve the pure shape deformations in the face shapes. In embodiments, registration is implemented by applying direct factorization, although those skilled in the art will recognize that many methods exist for performing registration and that the choice of registration method is not critical to the invention.

(i) Mesh Generation and Shape Modeling

Figure 4:
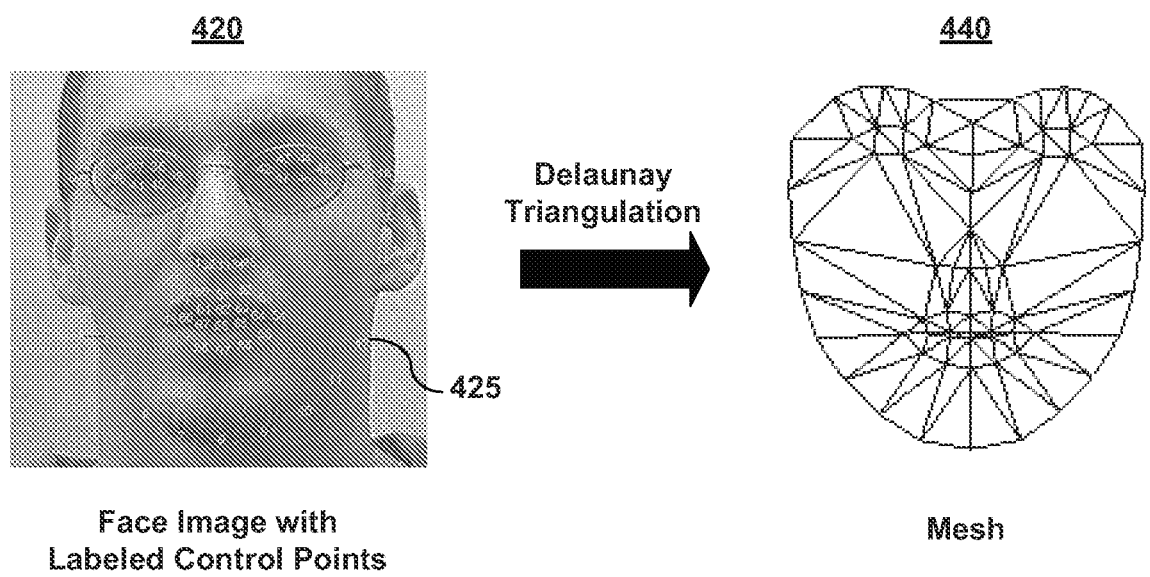
FIG. 4 depicts an exemplary illustration of using Delaunay triangulation to generate a mesh of a face image according to various embodiments of the invention.

In embodiments, mesh generator 310 produces a mesh representation of an object image within the training data set of object images 205 based on identified control points of the image. FIG. 4 is an exemplary illustration of using Delaunay triangulation to generate a mesh of a face image according to various embodiments of the invention. A set of control points are labeled (e.g., point 12 (425)) in a face image 420, and the labeled set of points provides the basis for subdividing the face image into a set of triangular regions 440. The boundaries of the set of triangular regions 440 form a mesh that may be used to represent a 2D shape of the face image features. Those skilled in the art will recognize that a variety of methods exist for generating a mesh representation of an object image, and that the choice of a mesh generating method is not critical to the invention.

In embodiments, 3D shape reconstructor and modeler 320 receives a set of meshes representing 2D shapes and generates a reconstructed 3D shape model based on the set of meshes. In embodiments, a set of 2D shapes are obtained from the labeled landmarks (feature points) in the training data set 205 by performing a shape alignment analysis, such as a Procrustes analysis, on the shapes in the training data set 205. By performing such analysis, the translational, rotational and scaling components of the shapes can be reduced.

In embodiments, the comprehensive global 3D shape model can be derived using the set of 2D shapes as input to a non-rigid structure from motion (NRSFM) algorithm, wherein the 2D shape are reconstructed as projections of the 3D shapes. In embodiments, a NRSFM algorithm is applied to the set of 2D shapes to decompose the 3D shape bases. The NRSFM algorithm directly factors the 2D shapes into projection matrices and 3D shape bases. The algorithm is typically initialized by decomposing a matrix W of the 2D shapes, into two matrices, M and B, via singular value decomposition (SVD), and solving for an ambiguity matrix, G, using rotation and basis constraints using the equation:

$$W = MGG^{-1}B \qquad (1)$$

Once G is known, the projection matrices are MG, and the 3D shape bases are $G^{-1}B$.

In embodiments, a set of reconstructed 3D shapes corresponding to the set of input meshes is generated using the 3D shape bases projected onto each of the input meshes. The reconstructed 3D shape model is generated by applying PCA to the set of reconstructed 3D shapes in order to compute another set of 3D shape modes.

In embodiments, a 3D shape model S may be described by the equation:

$$S = P \cdot \left( B_0 + \sum_{i=1}^{N_B} p_i B_i \right) \qquad (2)$$

where P is a camera projection matrix, $B_0$ is the mean shape, $B_i$ is a set of $N_B$ 3D shape modes, and $p_i$ is a set of shape basis projection weights. In embodiments, an iterative bilinear solution with NRSFM is used to estimate $B_i$ and $p_i$. In one embodiment, only the first few (1~3, for example) dominant $B_i$ along with the corresponding P and $p_i$ are found in the NRSFM algorithm. The known $B_i$, P, and $p_i$ are then used to initialize the bilinear algorithm and solve for the remaining $B_i$, P, and $p_i$ iteratively and sequentially until all parameters have been determined.

Figure 5:
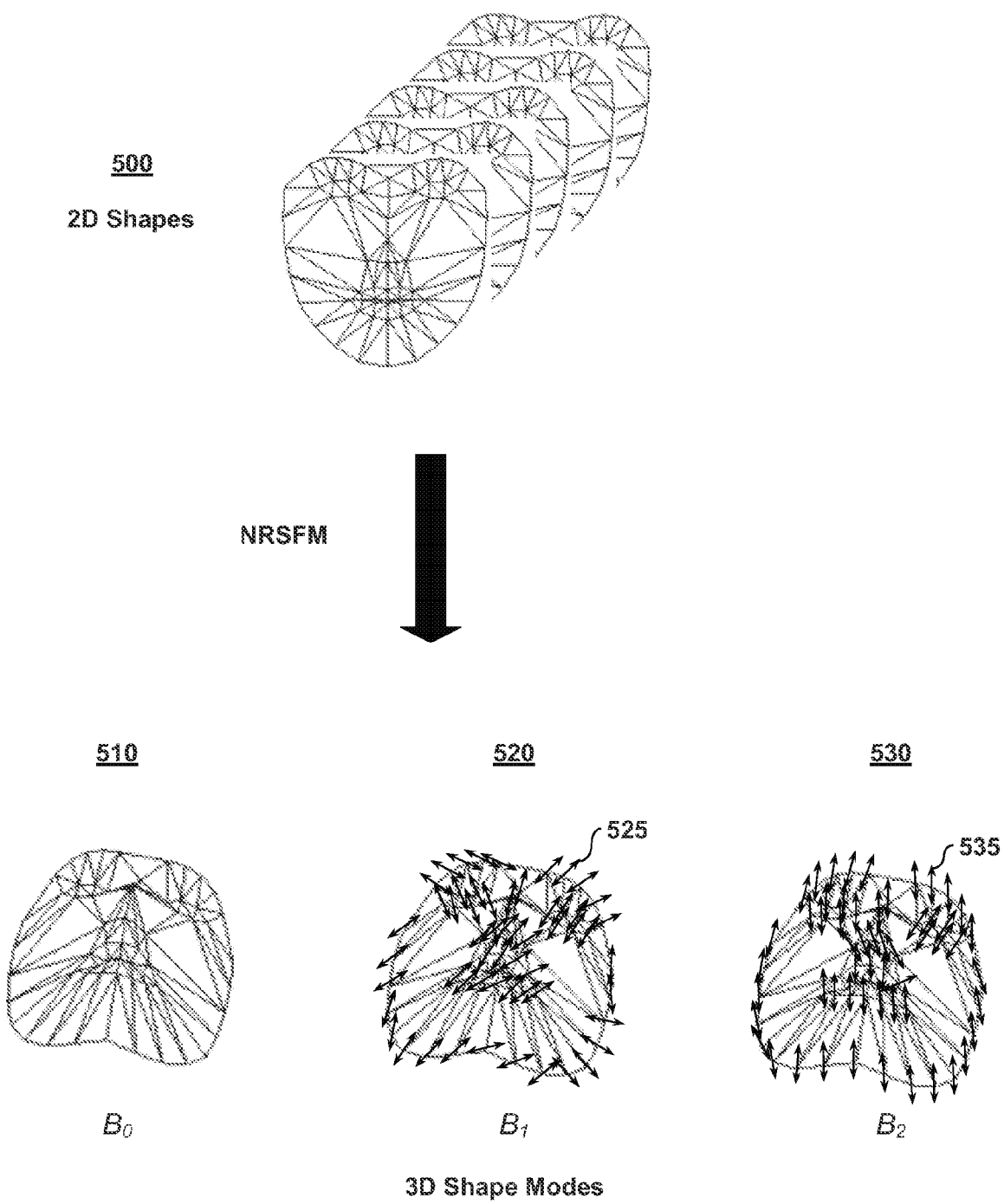
FIG. 5 illustrates generating 3D shape modes from 2D shapes according to various embodiments of the invention.

FIG. 5 illustrates the mean shape $B_0$ 510 and the first two 3D shape modes $B_1$ 520 and $B_2$ 530 of an exemplary 3D face shape model derived from a set of 2D shapes 500 according to various embodiments of the invention. The arrows (e.g., 525 and 535) depicted in the two illustrated shape modes (520 and 530) describe the shape motion.

(a) Adding Symmetry Constraints to a 3D Object Shape Model

In embodiments, the accuracy of the 3D face shape model may be improved by adding one or more symmetry constraints as in, for example, embodiments of method 1600.

In embodiments, a symmetry constraint may be added to the 3D Z-motion (depth) during the bilinear algorithm after the NRSFM algorithm has been applied. The bilinear algorithm iteratively solves for the remaining $B_i$, P, and $p_i$ by solving for $B_i$ while keeping P and $p_i$ constant, and then solving for P and $p_i$ keeping $B_i$ constant. This process alternates until the convergence criterion is achieved. Full or partial motion symmetry may be enforced by adding specifically designed constraints each iteration when solving for $B_i$.

Figure 6:
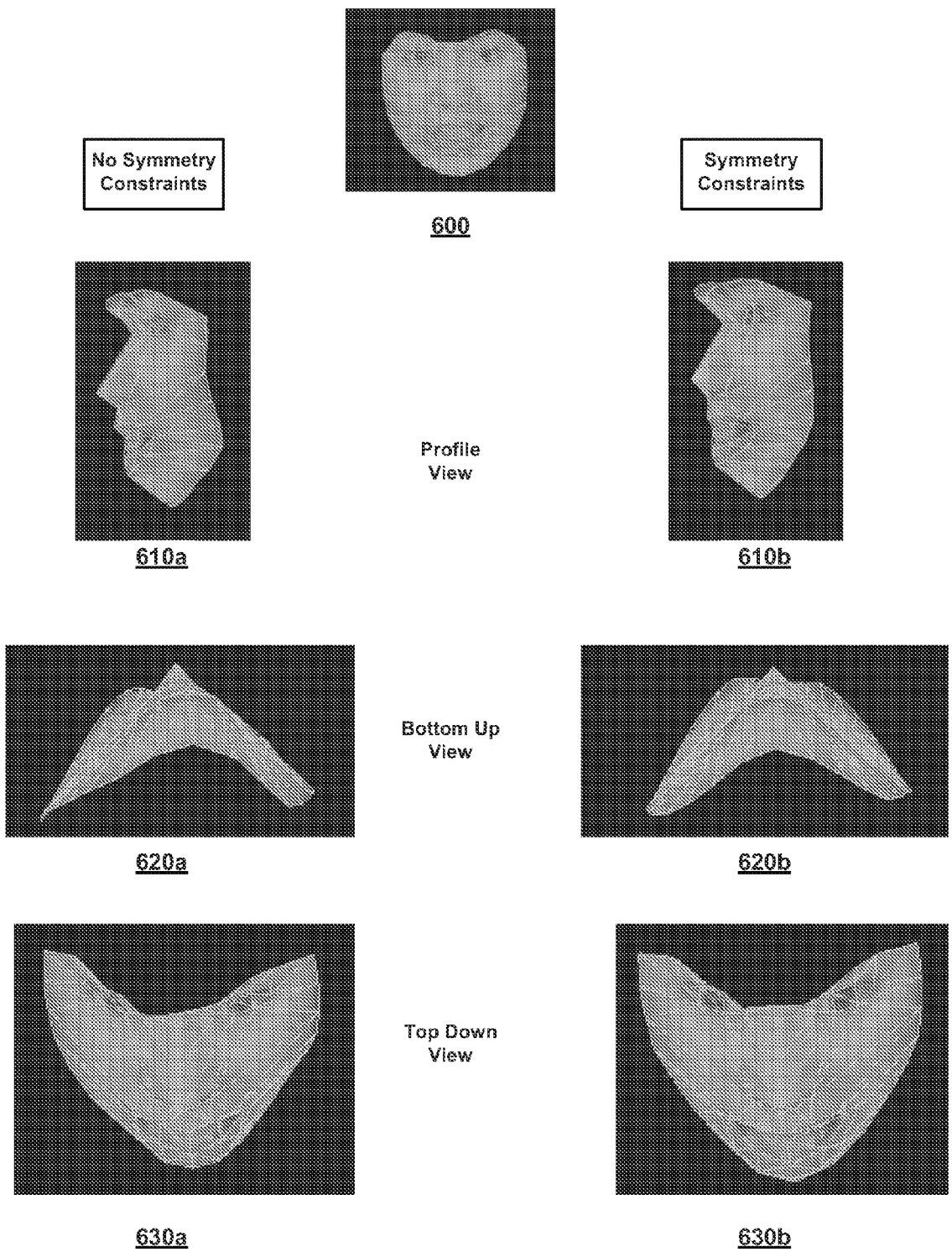
FIG. 6 illustrates views of a 3D shape model with no symmetry constraint and views of a 3D shape model with a symmetry constraint according to various embodiments of the invention.

FIG. 6 illustrates views of two reconstructed face images (600 is the frontal view of both reconstructed images) generated by fitting an input face image to two 3D face models derived from the same training data set of images. The reconstructed image with the illustrated profile, bottom up, and top down views on the left (610a, 620a, and 630a respectively) was fitted to a shape model that does not include symmetry constraints, while the reconstructed image with the illustrated profile, bottom up, and top down views on the right (610b, 620b, and 630b respectively) was fitted to a shape model that includes symmetry constraints. Notice that the model with symmetry constraints produced a more realistic face image as seen most notably when comparing unconstrained image 620a with constrained image 620b.

(ii) Appearance Modeling

In embodiments, subcomponent appearance modeler 330 receives a training data set of images 205 and generates a 2D image appearance model comprising a set of appearance models of image subcomponents.

In embodiments, a mean shape for object images in the training data set 205 may be obtained by performing a shape alignment analysis, such as a Procrustes analysis, on the object images in the training data set 205. In embodiments, each object image in the training data set 205 is warped to the mean shape in order to reduce size, alignment, and translation differences among the object images. Those skilled in the art will recognize that the Procrustes analysis is one of a variety of shape alignment analysis methods that exist, and that the choice of a shape alignment analysis method is not critical to the invention. In embodiments, each subcomponent i of a warped image is defined as a pixel or set of pixels forming a subset of the pixels in the shape normalized texture (i.e. canonical texture). In embodiments, the shape normalized texture may be manually defined, and, in other embodiments, may be defined by the mean 2D shape. In embodiments, face textures may be warped to this shape normalized texture to ensure pixel-to-pixel correspondence across textures so that the same pixel or set of pixels comprising a subcomponent in the shape normalized texture represent the same region of the face even though the original face textures may have originally had different sizes, rotations, and positions in the training images. As discussed below, a subcomponent appearance model $I_i$ may be computed from the pixels within the normalized subcomponent.

In embodiments, the triangular regions in the exemplary subdivided face image 440 may be grouped into larger regions representing facial subcomponents (e.g., left eye, right eye, nose, brows, mouth, and face sides). An appearance model $I_i$ of a the $i_{th}$ subcomponent may be derived from a training data set of images by extracting a set of linear appearance bases capable of representing the $i_{th}$ subcomponent in all the training data set images set by using a method of generating orthogonal bases (e.g., Principal Component Analysis (PCA)) and generating a linear combination of the bases according to the equation:

$$I_i = A_{i0} + \sum_{j=1}^{N_{Ai}} \lambda_{ij} \cdot A_{ij} \qquad (3)$$

where $I_i$ is the appearance model of subcomponent i, $A_{i0}$ is the mean subcomponent appearance image of subcomponent i, and $A_{ij}$ and $\lambda_{ij}$ are the $j_{th}$ appearance basis and corresponding projection weight, respectively, of the $i_{th}$ subcomponent for all $N_{Ai}$ bases. In various embodiments, the $i_{th}$ subcomponent may be the global face image. This global image appearance model may be used to model the co-existence of the image subcomponents. The global model covers the variations across all the image subcomponents together so it is able to smooth boundaries between adjacent subcomponents which may otherwise appear too distinct in a reconstructed image. In embodiments, the set of appearance bases are ortho-normalized when one of the subcomponents is a global image appearance model.

In embodiments, a face appearance model comprising a set of subcomponent appearance models may be derived from a training data set of face images 205. A set of $N_D$ facial subcomponents is determined, and a set of appearance models is generated as described in Equation (3).

(iii) Comprehensive Object Model Generation

In embodiments, object model builder 210 may generate a comprehensive shape-normalized face model that is a 3D AAM, which is a face image appearance model constrained by the global 3D shape model in Equation (2). In embodiments, the face image appearance model of the 3D AMM comprises a set of subcomponent appearance models as described in Equation (3). A face image appearance model, I, may be expressed in the equation:

$$I = \sum_{i=1}^{N_D} \left( A_{i0} + \sum_{j=1}^{N_{Ai}} \lambda_{ij} A_{ij} \right) \qquad (4)$$

where $N_D$ is the number of subcomponents, $N_{Ai}$ is the number of appearance bases for the $i_{th}$ subcomponent, and $\lambda_{ij}$ are the basis projection weights.

In embodiments, object model builder 210 may generate an object model fitting system 345 comprising the 3D AAM comprising the set of subcomponent appearance models in Equation (4) constrained by the global 3D shape model in Equation (2).

b) A Second Embodiment of an Object Model Builder Implementation

Figure 7:
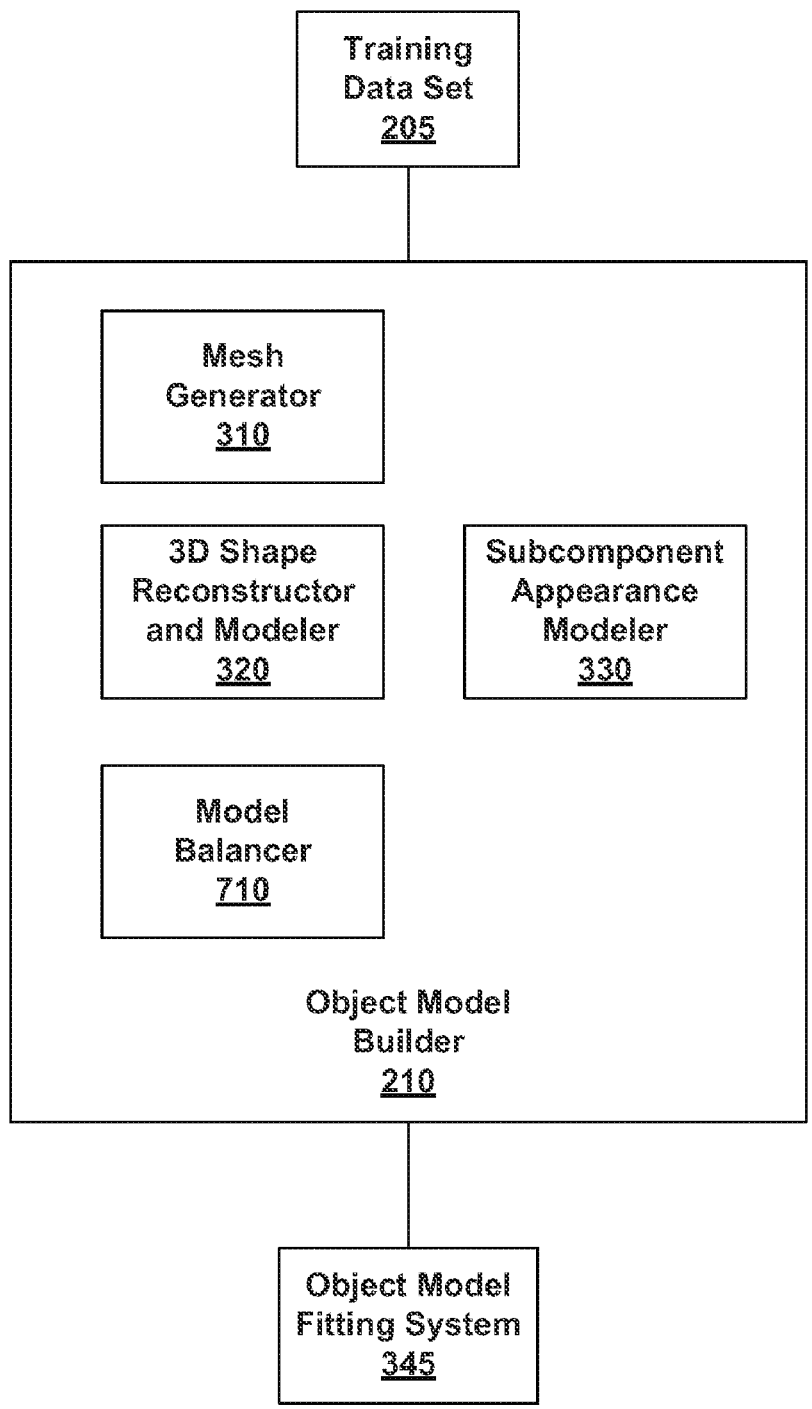
FIG. 7 depicts a block diagram of a second embodiment of an object model builder according to various embodiments of the invention.

FIG. 7 depicts a second embodiment of object model builder 210 that comprises mesh generator 310; 3D shape reconstructor and modeler 320, subcomponent appearance modeler 330, and model balancer 710.

(i) Model Balancing

A training data set 205 of images may be unbalanced, and unbalanced training data may lead to biased eigenvectors for shape and/or appearance after generating orthonormal bases, such as by using PCA. Examples of an unbalanced training data set include a data set with proportionately greater representations of images of a particular type (e.g., images of a particular subject in a set of face images), of images having a particular pose, or of images associated with particular environmental conditions (e.g., lighting conditions).

In embodiments, model balancer 710 improves the predictive power of shape and/or appearance models by correcting training data set imbalances. A training data set imbalance may be identified by fitting an interim object model to the training data set and calculating fitting errors for the training images in the training data set. If a subset of the training images has fitting errors greater than a threshold, the training data set is determined to be unbalanced. A subset may be defined as any number of images.

In embodiments, a training data set 205 of face images may be balanced either by adding more of the images having fitting errors greater than an error threshold to the data set (and increasing the size of the data set), or by weighting the images having fitting errors greater than an error threshold (and keeping the size of the data set constant). In embodiments, weights associated with the overall model fitting error may be computed by combining the shape registration error and the appearance error for an image. For example, in an embodiment, if there are three training images with fitting errors [1000, 2000, 3000], the weights assigned to the images may be computed by dividing the fitting errors by the total registration error, resulting in weights of [$\frac{1}{6}$, $\frac{1}{3}$, $\frac{1}{2}$] for the three training images respectively. Similarly, all fitting errors can be divided by the minimum fitting error and the result can be rounded to get a new set of numbers, [1000, 2000, 3000]/1000=[1 2 3]. These numbers correspond to the number of copies of each image to be included in the training data set. In other embodiments, the number of examples of each type of training image within a data set may be used to perform a single rebalancing of the training data by repeating training samples so that there is an equal number of each type of image within the draining data set. For example, in an embodiment, if there are two training images of type A and one of type B, image B can be repeated in the training data set so that the training data consists of the two original type A images, 1 original type B image, and 1 repeated type B image. Thus, images with larger fitting errors or fewer examples are weighted more.

In embodiments, a more balanced interim object model may be generated by applying PCA to the balanced training data set. In various embodiments, the shape and/or appearance models may be weighted and re-trained.

c) A Third Embodiment of an Object Model Builder Implementation

Figure 8:
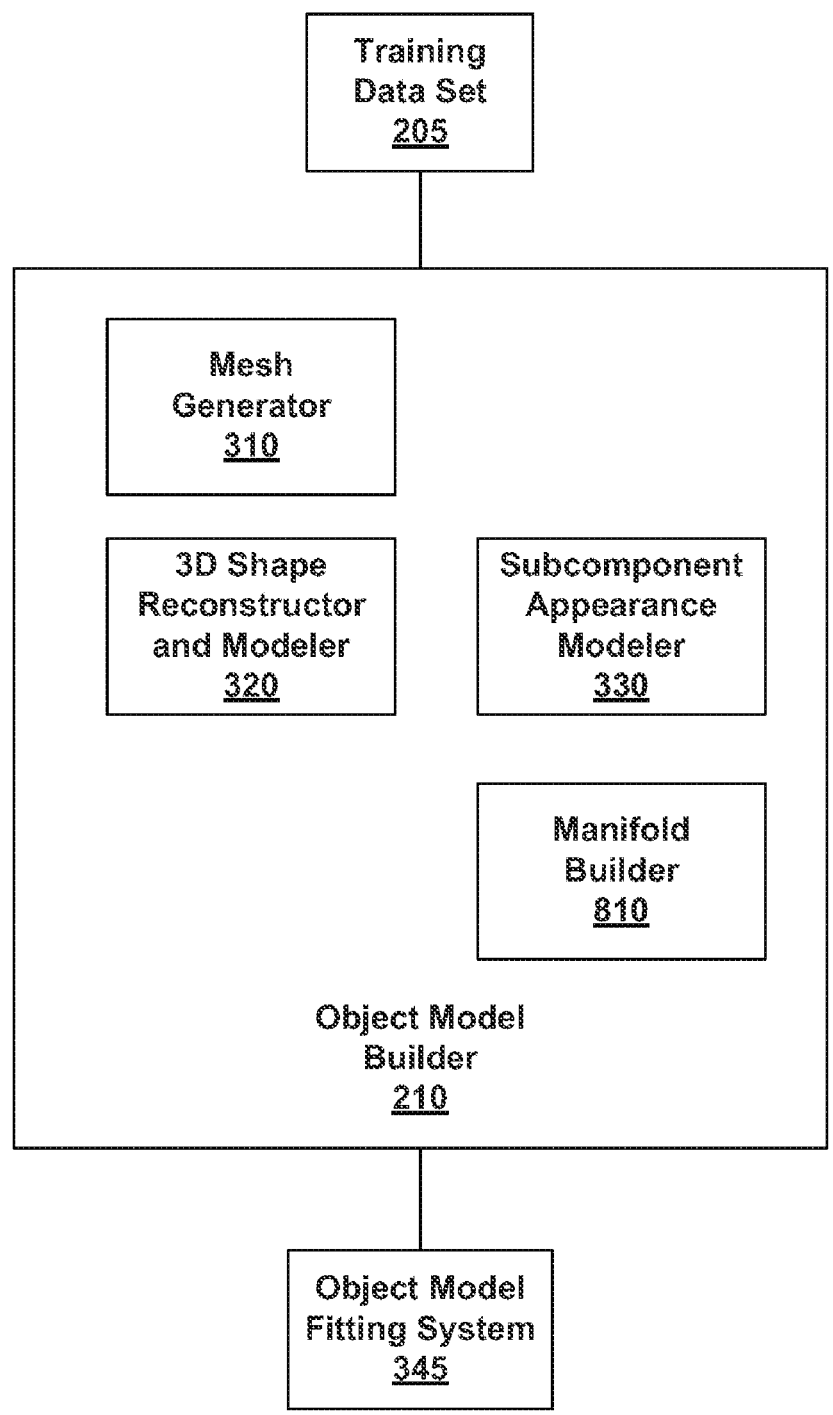
FIG. 8 depicts a block diagram of a third embodiment of an object model builder according to various embodiments of the invention.

FIG. 8 depicts a third embodiment of object model builder 210 that comprises mesh generator 310, 3D shape reconstructor and modeler 320, subcomponent appearance modeler 330, and manifold builder 810. The object model fitting system 345 may further comprise shape and/or texture manifolds.

(i) Shape and Texture Manifold Building

As the size of the training data set increases, the variability of the shape and appearance model parameters also typically increases. This increased parameter variability may increase the likelihood of generation of a non-valid reconstructed image during model fitting. In embodiments, manifold builder 810 generates a set of shape parameter vectors and/or a set of texture parameter vectors by fitting the generated shape and appearance models to the images in the training data set 205 in order to find the shape and texture parameters that best fit the models. In embodiments, a shape parameter vector is generated from the shape parameters for each training data set image, and a texture parameter vector is generated from the texture parameters for each training data set image. Manifold builder 810 builds a shape manifold using the set of generated shape parameter vectors, and/or builds a texture manifold using the set of generated texture parameter vectors.

In embodiments, the parameter vectors within a manifold are clustered according to a clustering algorithm, such as, for example, K-Means Clustering (K-Means). Those skilled in the art will recognize that there are many clustering algorithms (Mean Shift is another exemplary clustering algorithm), and that the choice of a clustering algorithm is not critical to the invention. The cluster centers and respective cluster co-variances determined by the clustering algorithm provide the basis for manifold constraints to be added to the object model fitting system 345. During model fitting, the likelihood of an invalid reconstructed image 225 generated from the object model fitting system 345 can be reduced because the updating of shape and/or texture parameter vectors may be constrained based on the distance of these vectors to manifold cluster centers. Shape and texture manifold building may be implemented by manifold builder 810 as described in embodiments of method 2100.

Figure 9:
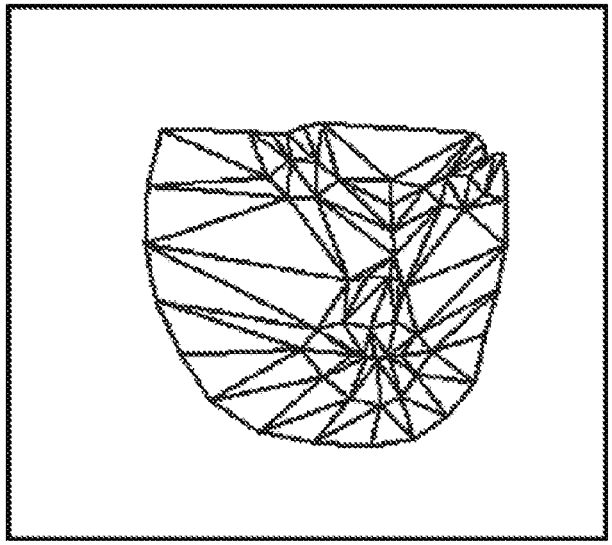
FIG. 9 illustrates exemplary unconstrained and manifold constraint face shapes according to various embodiments of the invention.
Figure 9:
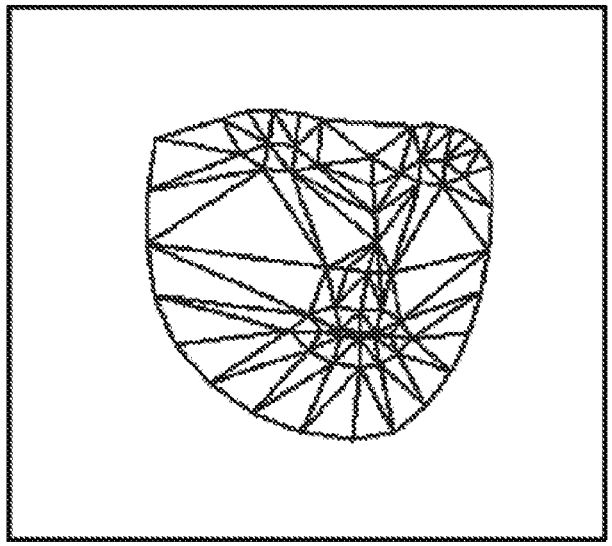

FIG. 9 illustrates exemplary reconstructed face shapes derived from fitting an input face image to two face shape models according to various embodiments of the invention. Reconstructed face shape 910 was fitted to a face shape without including manifold constraints, while reconstructed face shape 920 was fitted to a model of the same face shape that included manifold constraints. Shape 920 produces a more realistic face shape as compared with the unconstrained shape 910.

d) A Fourth Embodiment of an Object Model Builder Implementation

Figure 10:
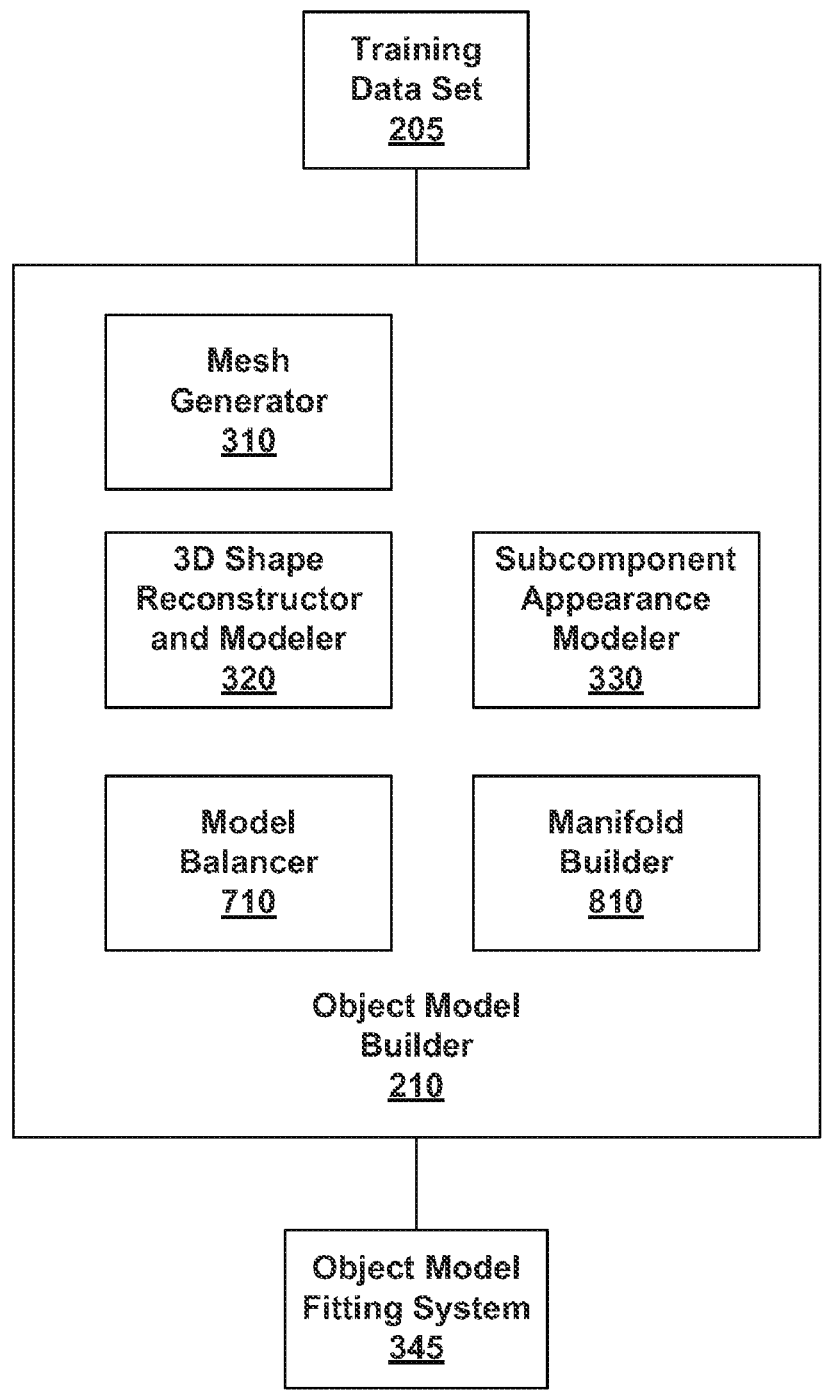
FIG. 10 depicts a block diagram of a fourth embodiment of an object model builder according to various embodiments of the invention.

FIG. 10 depicts a fourth embodiment of object model builder 210 that comprises mesh generator 310, 3D shape reconstructor and modeler 320, subcomponent appearance modeler 330, model balancer 710, and manifold builder 810. This embodiment combines all of the elements of the previous object model builder 210 embodiments, and may generate an object model fitting system 345 comprising a 3D AAM comprising a set of subcomponent appearance models, a global 3D shape model, and shape and/or texture manifolds.

2. Object Model Fitting Implementations

Figure 11:
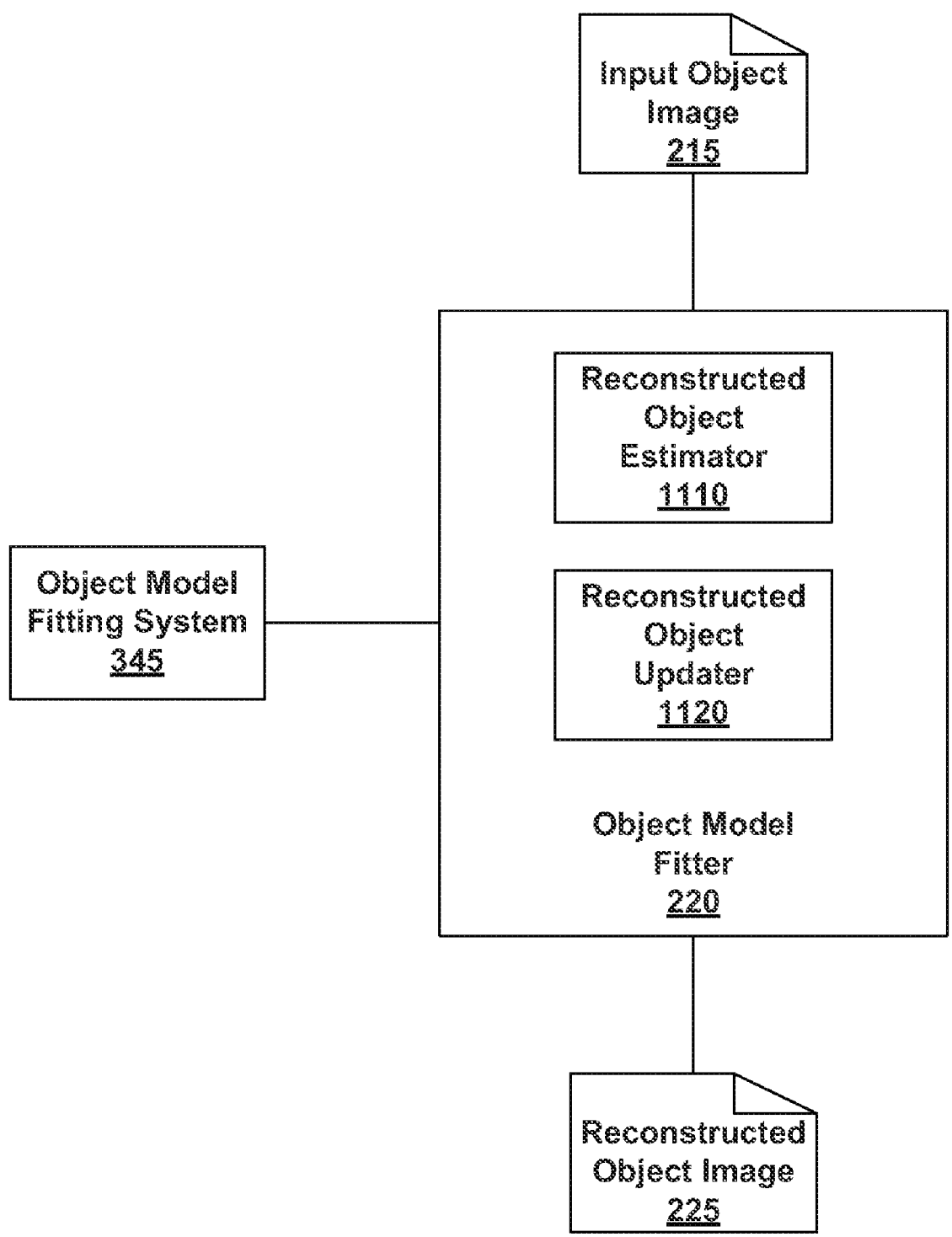
FIG. 11 depicts a block diagram of an object model fitter according to various embodiments of the invention.

FIG. 11 depicts an object model fitter 220 that generates a reconstructed image 225 by using an object model fitting system 345 to fit an object model to an input object image 215 according to various embodiments of the invention. Object model fitter 220 comprises reconstructed image estimator 1110 and reconstructed image updater 1120.

Figure 12:
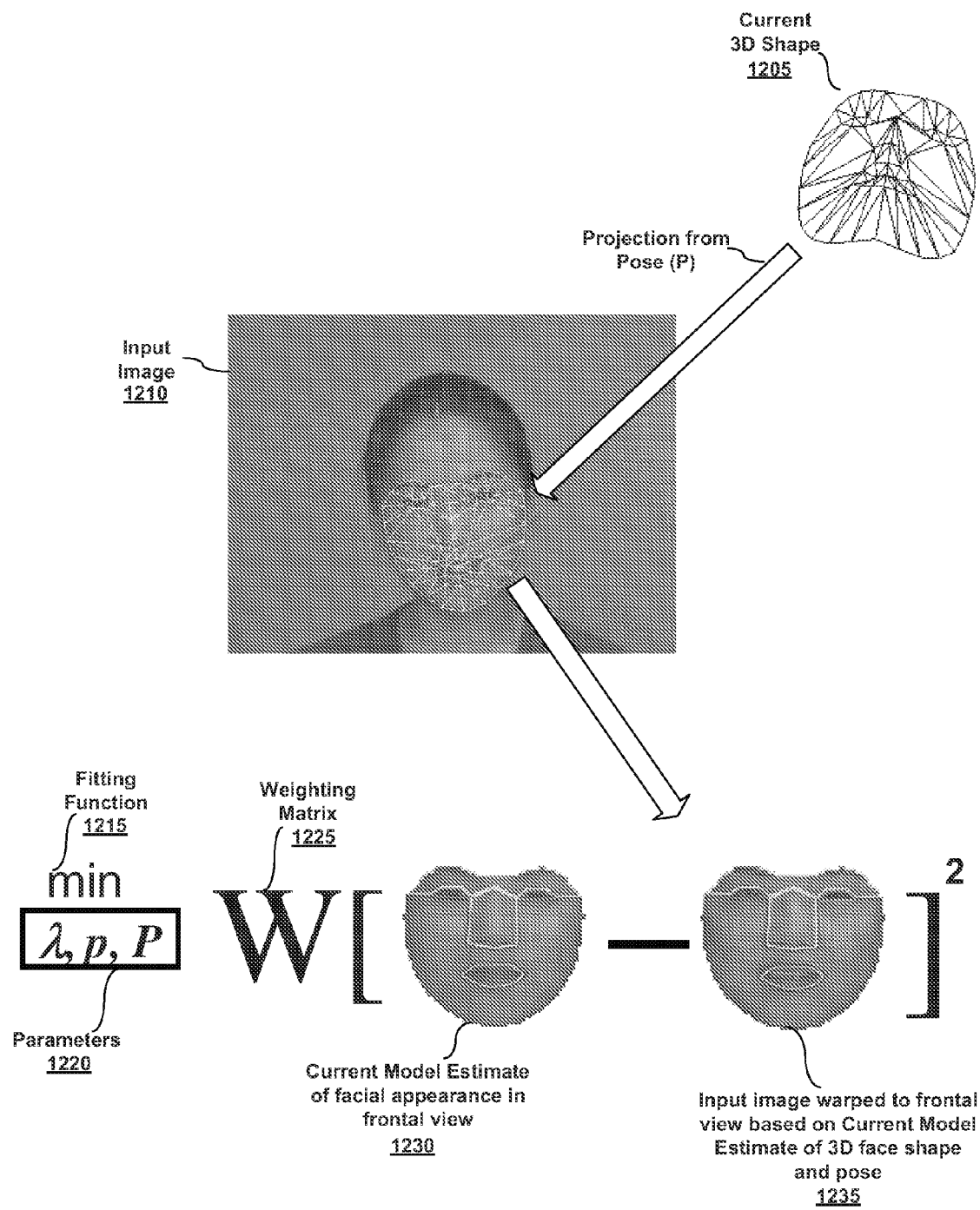
FIG. 12 depicts an exemplary model fitting process according to various embodiments of the invention.

In embodiments, object model fitter 220 is a face model fitter, and reconstructed image estimator 1110 uses an object model fitting system 345 comprising a face model to fit an input face image 215 to the face model by determining the values of parameters corresponding to 3D face pose, face shape, and facial features of the input face image 215 that minimize the difference between the face model and the input face image 215. In embodiments, the face model may be the appearance model in Equation (4) constrained by the global 3D shape model in Equation (2). In embodiments, minimization is computed by iteratively updating parameter values within a fitting function, re-computing a face model estimate, and re-fitting the input face image to the current face model estimate using the Levenberg-Marquardt (LM) algorithm, a variation of the steepest (gradient) descent algorithm, which is well known to those skilled in the art. FIG. 12 depicts an exemplary face model fitting process according to various embodiments of the invention.

The current reconstructed estimate of 3D face shape and pose 1205 is projected onto the input face image 1210, and the projected input face image is warped to a canonical view 1235. In the illustrated example, the frontal view is the canonical view. The current reconstructed face appearance estimate in canonical view 1230 is compared to the warped input face image 1235, and the difference is a fitting error. In embodiments, the fitting error may comprise a set of fitting errors.

In embodiments, reconstructed object updater 1120 computes a fitting error representing the difference between a current object model appearance estimate in a canonical view 1230 and a current appearance estimate of an input object image warped to the canonical view 1235 based on a current estimate of 3D object shape and pose 1205.

In embodiments, reconstructed object updater 1120 iteratively applies a fitting function 1215 for determining the model shape (p), pose (P), and texture (λ) parameter 1220 values that minimize the fitting error. In embodiments, a fitting function 1215 may be implemented according to the equation:

$$\min_{\lambda,p,P} W \left[ \sum_{i=1}^{N_D} \left( A_{i0} + \sum_{j=1}^{N_{Ai}} \lambda_{ij} A_{ij} \right) - T(I; p, P) \right]^2 \quad (5)$$

where W is a weighting matrix and T(I;p,P) is a transformation of the image pixels, I, to the mean shape using the shape and pose parameters.

Initially, mean values for reconstructed object image 225 3D shape (p), pose (P), and texture (λ) parameters 1220 are used. Values for 3D shape (p), pose (P), and texture (λ) parameters 1220 are iteratively adjusted to reduce the fitting error. The final values for 3D shape (p), pose (P), and texture (λ) parameters 1220 are determined when the fitting error between the set of facial appearance models and the projected input object image is minimized, or when some other stopping criterion has been reached, such as, for example, number of iterations or lack of significant changes in fitting error between iterations.

a) Inverse Compositional Model Fitting Solution

In embodiments, the final values for 3D shape (p), pose (P), and texture (λ) parameters 1220 may be computed using an inverse compositional solution fitting function 1215 that determines reconstructed texture (λ) parameters based on solving for the minimized update to the shape parameters Δp in the image frame according to the equation:

$$\min_{\lambda,\Delta p} W \| T(A(\lambda); \Delta p) - T(I; p) \|^2 \quad (6)$$

and then computes texture reconstruction A(λ) according to the equation:

$$A(\lambda) = A_0 + \sum_{i=1}^{N_a} A\lambda \quad (7)$$

where $A_0$ is the mean appearance and $N_a$ is the number of appearance bases.

In embodiments, the update to the shape parameters Δp may be calculated according to the equation:

$$\Delta p = R \cdot E \quad (8)$$

where R is a shape parameter update matrix and E is a registration error vector E=($A_0$−I).

In embodiments, Δp is used to determine $S_{shape}$, the new shape estimate, according to the equation $$S_{shape} = T(S_0;p) + T(S_0;-\Delta p) \quad (9)$$

where $S_{shape}$ is the mean shape ($S_0$) warped by the shape parameter update, Δp, and then warped to the image frame by the current shape parameters, p, T($S_0$;p) is the current shape estimate, and T($S_0$; −Δp) is the delta shape (Note that T(x,p) defines a warping of the shape, x, by the parameters, p).

In embodiments, a 2D shape update $\Delta \hat{p}$ in the image frame may be determined according to the equations:

$$\min_{\Delta \hat{p}} \| S_{shape} - (S_o + S(p - \Delta \hat{p})) \|^2 \quad (10)$$

$$\Delta \hat{p} = -S'(S_{shape} - (S_0 + Sp)) \quad (11)$$

where S is the set of shape eigenvectors, S' is the transpose of S, and $S_p$ is the modified set of shape eigenvectors. The updated shape parameters p in the image frame may be computed using the previous best parameters (where best parameters are the parameters from the previous iteration that resulted in the lowest registration error), $p_0$ (the mean shape parameters) and $\Delta \hat{p}$, according to the equation:

$$p = p_0 - \Delta \hat{p} \quad (12)$$

Note that the solution for shape reconstruction in Equations (10) and (11) does not include an implementation of a weighting matrix W for the shape vectors. In embodiments, a shape reconstruction may be weighted, and $\Delta \hat{p}$ in the image frame may be determined according to the equation:

$$\Delta \hat{p} = -(S'WS)^{-1}S'W(S_{shape} - (S_0 + Sp)) \quad (13)$$

In embodiments, it should be noted that a 3D shape update Δp may be represented as $$\min_{\Delta p} \| S_{shape} - P(S_o + S(p - \Delta \hat{p})) \|^2$$

where P is the projection matrix. The solution to this equation does not have a closed form (like Equation (11) for the 2D case). In a 3D system, an approximate solution for P and Δp is determined by an iterative gradient descent algorithm.

In embodiments, the image texture λ is extracted from the image frame warped using the updated shape parameters (T(I;p)), according to the equations:

$$\min_{\lambda} W\|A_o + A\lambda - T(I; p)\|^2 \quad (14)$$

$$\lambda = -(A'WA)^{-1}A'W(A_o - T(I; p)) \quad (15)$$

where A is the set of texture eigenvectors, $A_0$ is the set of mean texture vectors, the transposed texture vectors matrix A' is a $P_T \times N$ matrix of texture eigenvectors ($P_T$ is the number of texture modes and N is the number of pixels), and W is an N×N weighting matrix.

In embodiments, the weighted reconstruction error matrix E then may be determined based on the difference between the reconstructed image I and the texture λ extracted from the image according to the equation:

$$E = A_0 + \sum_{i=1}^{N_{Ai}} A\lambda - I \quad (16)$$

where $N_{Ai}$ is the number of texture bases for the $i_{th}$ subcomponent.

b) Robust Model Fitting

The illustrated exemplary face appearance model estimate 1230 and warped input face image appearance estimate 1235 have been subdivided into six facial subcomponents (left and right eyes, nose, mouth, forehead/brow line, and cheeks/chin area). In embodiments, after fitting the current face model appearance estimate to the input face image appearance estimate, face subdivisions (such as, for example, facial subcomponents) and/or pixels may be weighted related to one or more factors. In embodiments, the object model fitting system 345 may further comprise weights.

In embodiments, weighting may be associated with image characteristics, such as, for example, model complexities, fitting errors, gradient magnitude, edges, and categories of persons and/or capturing conditions. The type of weighting method implemented may depend on the model and/or fitting objective. For example, weights based on registration errors may be useful for fitting the model given occlusions in the input object image. In another example, weights based on the 3D object pose may be used to downweight parts of the object model that face away from the camera and/or increasing the weights of object model parts most directly facing the camera. In various embodiments, the type of weighting method implemented may be based on both the registration error and 3D pose. Those skilled in the art will recognize that various types of weighting methods exist, and that the selection of weighting method is not critical to aspects of the invention.

In embodiments, robust fitting may be implemented by applying a weighting matrix 1225 based on different weighting of features of pixels, regions of pixels, and/or facial subcomponent regions of pixels. For example, in an embodiment, a face model may be sub-divided into a set of triangular regions (triangles), and weighting may be applied to the triangles within the set of triangles. Each triangle contains a number of pixels, and the registration error for each triangle may be computed by finding the mean of the absolute values of the registration errors for each pixel in the triangle. The mean registration errors for the set of triangles are computed and converted to binary weights during each iteration of the model fitting process. Binary weights are computed based on the distribution of the set of triangle registration errors. For example, the median of the registration errors for the set of triangles may be used to define a Gaussian function. For example, if a triangle registration error is less than an empirically estimated threshold of 0.5, the triangle is given a binary weight of zero. Otherwise, the triangle is given a binary weight of one.

Typically, fitting robustness increases and efficiency decreases as the size of a weighted image region (such as, for example, a triangle or a facial subcomponent) decreases, but compromises may be made to increase fitting efficiency. A binary weighting function (such as, for example, as previously described in the exemplary scenario) has the advantage of efficiency, but at the cost of accuracy compared to other popular weighting functions, such as those based on exponential or Gaussian distributions. Those skilled in the art will recognize that the choice of weighting function for implementation of robust fitting is not critical to aspects of the invention.

In various embodiments, weighting at the subdivision and/or pixel level may be based on an image gradient map. For example, edge pixels may be given higher weights because edges contain useful information about model shape and are immune to variations in most lighting conditions. In embodiments, pixel weighting may be based on characteristics such as, for example, image error, distance from the model center, and gradient magnitude.

Figure 13:
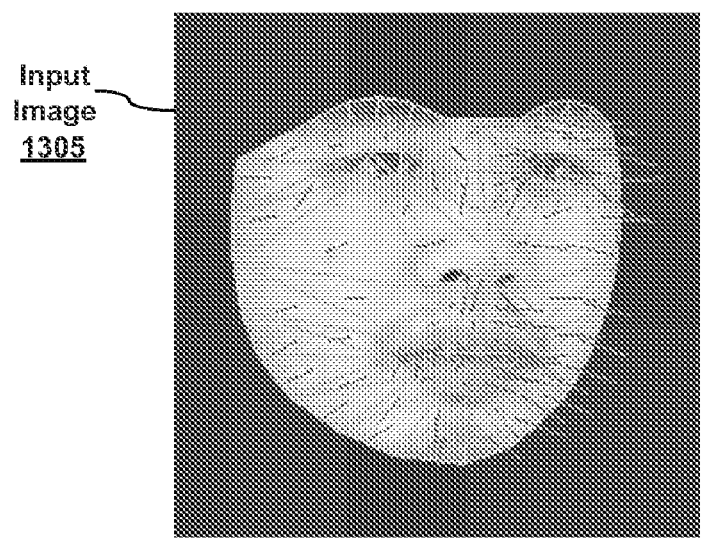
FIG. 13 illustrates an exemplary computation of pose-based weighting of pixels within subdivisions of a face image according to various embodiments of the invention.
Figure 13:
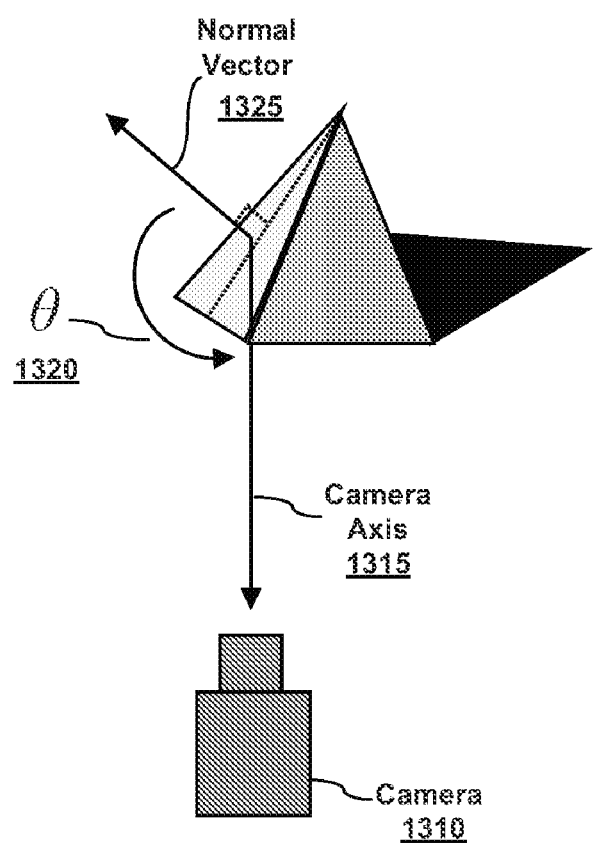

In embodiments, pose-based pixel weighting may be applied so that higher weights are given to pixels most directly facing the camera. FIG. 13 illustrates an exemplary computation of pose-based weighting of pixels within subdivisions of a face image according to various embodiments of the invention. The exemplary input face image 1305 has been subdivided into triangular regions using Delaunay Triangulation, as previously described, and the camera axis 1315 (relative position of the camera 1310) for each triangle is diagrammed. In embodiments, the normal vector 1325 for each triangle is computed, and the angle θ 1320 between the normal vector and the camera axis is computed. In embodiments, pose-based model weights for the triangular regions may be based on a distribution of the computed angle θ of the normal vectors according to the equation:

$$1-(\min(\theta,\pi/2)*2/\pi)^4 \quad (17)$$

Because the pose and shape parameters and mesh define a 3D shape mesh comprising triangles/subdivisions, each triangle in the 3D shape mesh may have a normal direction. The angles between the normals and the camera axis in the 3D shape mesh can be used to update the weights. Thus, pose and shape parameters affect the weights because they are used to determine the 3D shape, but, in embodiments, the weights are computed based on the computed angle θ of the normal vectors, as described. In embodiments, pose-based weights may be updated by determining an angle for a triangle. All pixels in the mesh triangle may be associated with the same angle or a normal angle may be interpolated at each pixel in the triangle. A subcomponent of the object can be formed from a plurality of triangles and/or portions thereof, and the pose-based weight associated with the subcomponent may be computed by averaging the angles associated with the pixels that form the subcomponent. For example, in embodiments, the normal angle for a subcomponent may be computed by averaging the angles associated with pixels that form the subcomponent.

Figure 14:
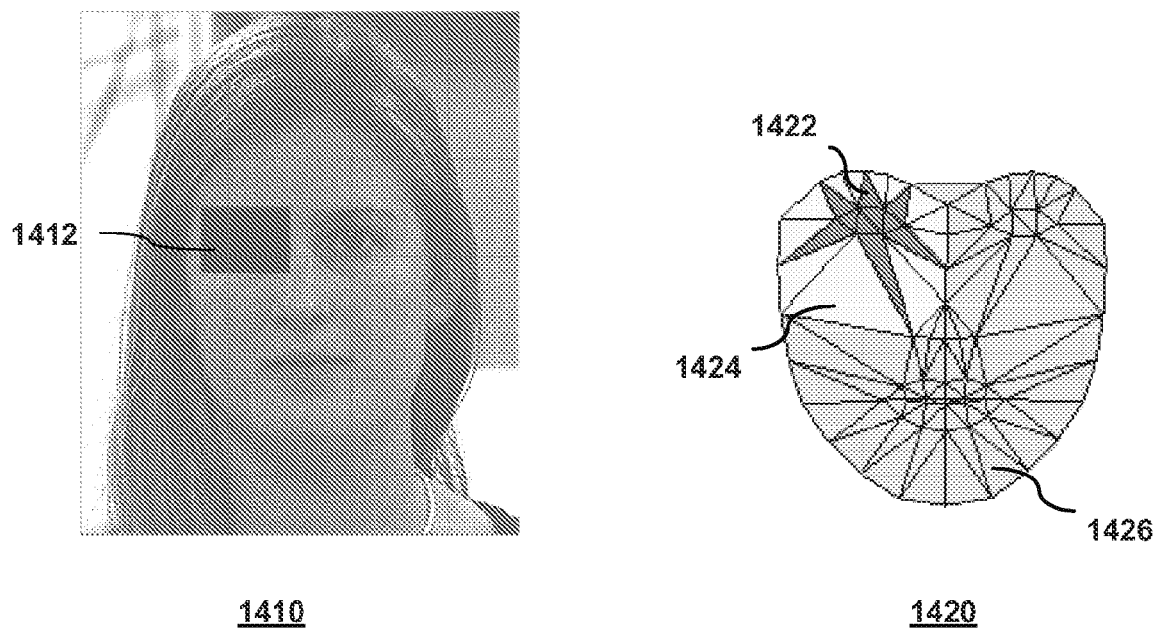
FIG. 14 illustrates an exemplary weighting of pixels based on registration error for a face image with an occlusion according to various embodiments of the invention.

In embodiments, registration error weighting of object image subdivisions and/or pixels may enable robust fitting of the object model to an input object image containing occlusions (regions with missing data). FIG. 14 illustrates an exemplary weighting of pixels based on registration error within an occluded face image according to various embodiments of the invention. The exemplary input face image 1410 has been subdivided into triangular regions 1420 using Delaunay Triangulation, as previously described. In embodiments, the triangular regions (e.g., 1422 and 1424) within a facial subcomponent corresponding to the occluded right eye 1412 of an input face image may have larger fitting errors, and thus those regions may be given smaller weights than other regions (e.g., 1426) within the input face image. Since, in embodiments, weighting may be done at both a pixel level and a subcomponent level, the pixels in the occluded triangular regions having the greater fitting error (e.g., 1422) may be given lower weights that the pixels in other triangular regions (e.g., 1424) within the occluded region. In the illustration, the regions within the occluded subcomponent 1412 having the greater fitting error (e.g., 1422) are colored darker than the other regions (e.g., 1424) within the occluded subcomponent.

In embodiments, weights assigned based on registration error automatically adapt to extracted input face image data, so robust estimation policies should cover input face images with and without occlusions. As the model shape iterates towards convergence, the model will cover new pixels in the image. Each time the registration error is updated, new weights are computed. If there are no occlusions the registration error will likely be similar throughout the face region so the weights will all be relatively equal. However, if a certain part of the model is unable to fit to a part of the face, due to occlusions or otherwise, that part of the face region will result in large registration errors which in turn will give that part of the model lower weights.

(i) Iterative Weight Matrix Updating

In embodiments, the weighting matrix 1225 may be adjusted iteratively by the reconstructed object updater 1120 during the fitting process. For example, in embodiments employing error-based weighting, the previous object image registration error may be used to compute new fitting weights at the beginning of each iteration of the fitting process, and then the object model parameters are updated.

In embodiments implementing an inverse compositional fitting solution, a shape parameter update $\Delta p$ may be found by multiplying the shape parameter update matrix R with a registration error weighting vector E according to Equation (8), as previously discussed. In embodiments, the shape parameter update matrix R may be pre-computed and thus not updated during fitting if shape parameter weighting is not used (e.g., a weighting matrix W is set to be the identity matrix), or if constant shape parameter weighting is used (e.g., the weighting matrix W is set to be a constant weight). However, in other embodiments, a weighting matrix W is used to compute R and the weighting matrix W must be re-computed at each fitting iteration.

For example, in embodiments, a shape parameter update $\Delta p$ may be computed using an R that is computed using a weighting matrix W according to the equation:

$$\Delta p = -(SD'WSD)^{-1}SD'W(A_0-I) \qquad (18)$$

where $R=-(SD'WSD)^{-1}SD'W$ and $E=(A_0-I)$ and SD is a $P_S \times N$ steepest descent matrix of shape eigenvectors ($P_S$ is the number of shape modes and N is the number of pixels) to a gradient of appearance means according to the equation:

$$SD = \left(\nabla A_0 \frac{\partial W}{\partial p}\right) \qquad (19)$$

In this case, the objective function for the shape update $\Delta p$ is expressed in terms of the steepest descent matrix and W (an N×N weighting matrix) according to the equation:

$$\min_{\Delta p} W \left\| A_0 + \nabla A_0 \frac{\partial W}{\partial p} \Delta p - I \right\|^2 \qquad (20)$$

where $A_0$ is the mean shape, and I is the current shape model estimate.

In embodiments, an N×N weighting matrix W also may be applied to the extraction of texture parameters $\lambda$ from the image frame, as described in Equations (14) and (15).

In embodiments, an iterative update to weighting matrix W is computed based on the image reconstruction error, E (See Equation (16)) using the reconstructed image, $A_0+A\lambda$. Note that $\lambda$ must first be estimated (See Equations (14) and (15)) before the reconstruction error E can be computed, as previously described.

Iterative fitting methods employing pixel based error weighting, as illustrated in the previous examples, may be computationally expensive because the weights change for every iteration and thus the parameter update matrices R (e.g., $-(SD'WSD)^{-1}SD'W$ in Equation (18) and $-(A'WA)^{-1}A'W$ in Equation (15)) must be recomputed for every pixel at every iteration. In embodiments, the performance of iterative fitting methods may be optimized by solving for model parameter updates based on the weights of groups of pixels within regions (such as, for example, the triangular regions illustrated in FIG. 14) of an image. In embodiments, these regions may correspond to image subcomponents.

For example, in embodiments, the image registration error of the pixels may be used to compute the mean error e for each triangular region (triangle) of an image subdivided into t triangular regions of pixels (e.g., See 440 in FIG. 4):

$$E_t = [e_1, e_2, \ldots, e_t] \text{(mean triangle errors, for t triangles)}$$

The median error $E_m$ may be computed as the center of a Gaussian distribution G(x) of the set of t triangle errors:

$$E_m = \text{median}(E_t)$$

As is well known to those skilled in the art, the standard deviation stddev of this distribution may be computed as a number multiplied by the median. For example, using a median absolute deviation, the standard deviation can be determined as stddev=1.4826*median. Although, one skilled in the art shall recognize that other alternatives to the median absolute deviation may be used. The Gaussian function G(x) may be computed as:

$$G(x) = \exp(-0.5*(x-E_m)^2/(1.4826*E_m)^2)$$

In embodiments, the weight $w_i$ of the $i^{th}$ triangle may be computed based on the value of the mean triangle error $e_i$ of the $i^{th}$ triangle on this distribution:

$$w_i = G(e_i)$$

In alternate embodiments, the weight $w_i$ of the $i^{th}$ triangle may be a binary weight based on the Gaussian function G(x) such as, for example:

$$\text{If } w_i < 0.5, \text{ then } w_i = 0 \text{ else } w_i = 1$$

where 0.5 is an arbitrary threshold between 0 and 1.

In embodiments, weights representing a region-based level of granularity may be used during fitting to solve for updated texture ($\lambda$) and shape parameter updates ($\Delta p$) of an image. For example, given an image containing T components (triangles) where a triangle t contains a set of $x_t$ pixels, a $N \times P_T$ texture eigenvectors error weighting matrix A and a $N \times P_S$ shape eigenvectors error weighting matrix SD are computed for each triangle t, where $A_x$ is a $1 \times P_T$ row of the eigenvector matrix and $SD_x$ is a $1 \times P_S$ row of the steepest descent matrix.

Solutions for the updated image texture λ and shape Δp parameters using triangle-based weights may be implemented according to the equations:

$$\lambda = -\left(\sum_{t=1}^{T} w_t \sum_{x \in x_t} A'_x A_x\right)^{-1} A' W(A_0 - I) \quad (21)$$

$$\Delta p = -\left(\sum_{t=1}^{T} w_t \sum_{x \in x_t} SD'_x SD_x\right)^{-1} SD' W(A_0 - I) \quad (22)$$

In embodiments, the values $$\sum_{x \in x_t} A'_x A_x \text{ and } \sum_{x \in x_t} SD'_x SD_x$$

may be pre-computed in order to further optimize the fitting method performance.

c) Object Model Fitting With Manifold Constraints

In embodiments, the object model fitting system 345 may further comprise manifold constraints. Shape and/or texture manifolds, which may have been generated in embodiments of manifold builder 810, may be used to constrain parameter updates during the object model fitting process, as exemplified by method 2500.

C. Methods for Object Model Building

The following sections describe various embodiments of methods for generating an object model based on a training data set of images. The method embodiments may be implemented in embodiments of object model builder 210.

1. A First Embodiment of a Method for Generating an Object Model

FIG. 15 depicts a method 1500 for generating an object model fitting system comprising an object model according to various embodiments of the invention. Method 1500 comprises the steps of generating a 3D shape model and an appearance model based on a set of 2D subcomponent models 1505, and generating an object model fitting system comprising an object model comprising the appearance model constrained by the 3D shape model 1510. Method 1500 may be implemented in embodiments of object model builder 210 comprising mesh generator 310, 3D shape reconstructor and modeler 320, and subcomponent appearance modeler 330.

a) Generating 3D Shape and Appearance Models

In embodiments, a 3D shape model and an appearance model of an object are generated 1505 based on a training data set of object images.

Figure 16:
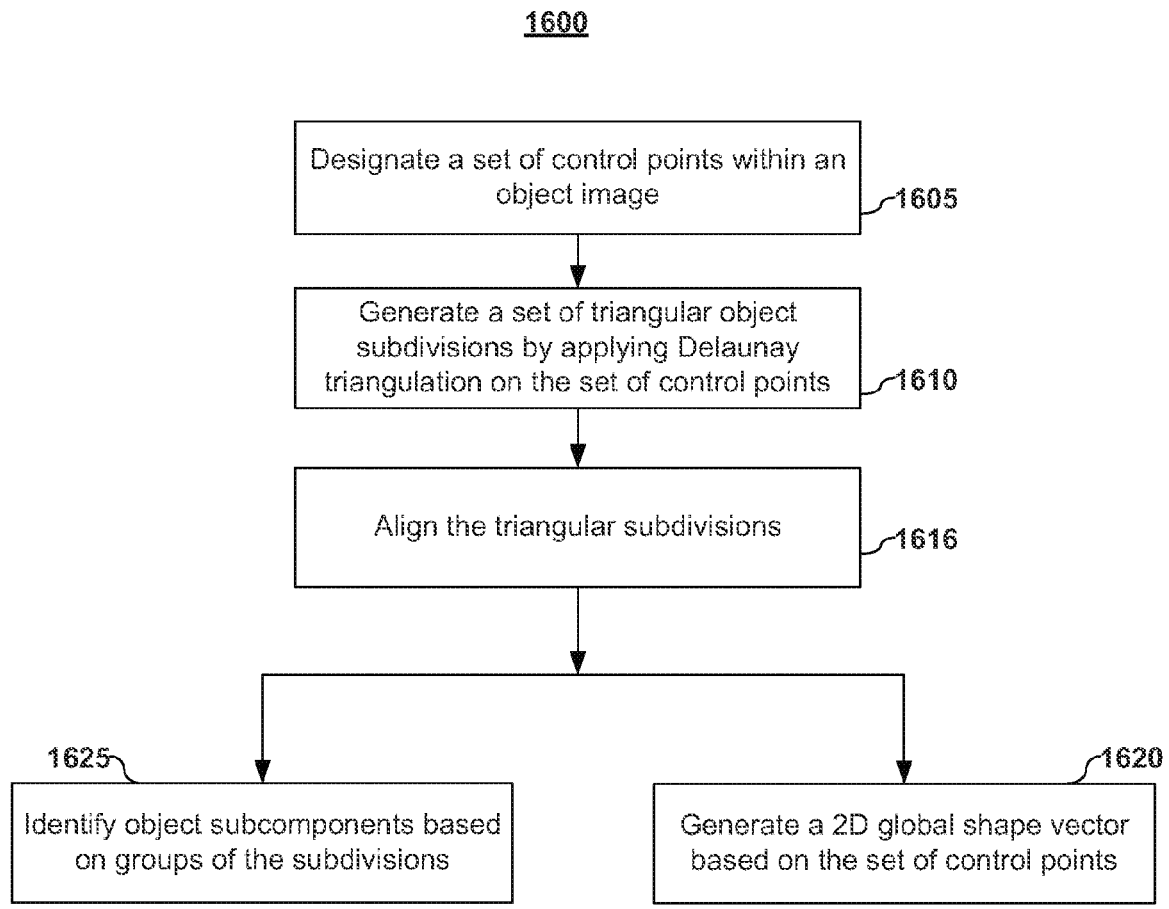
FIG. 16 depicts a method for extracting features from an image according to various embodiments of the invention.

FIG. 16 depicts a method 1600 for extracting features from an object image according to various embodiments of the invention. In embodiments of method 1500, step 1505 may comprise an implementation of method 1600. Method 1600 may be implemented in embodiments of mesh generator 310.

A set of features or control points for an object image may be identified 1605 and assigned labels. Control points may be pre-defined as part of the set of object images, user defined, or both. In embodiments, the training data set may comprise face images, and the set of control points may be labeled in each face image within the training data set. Groups of these control points within a face image may correspond to facial components such as, for example, eyes, brows, nose, mouth, and face sides. The exemplary face image 420 illustrates labeled control points.

In embodiments, the labeled set of control points may provide the basis for subdividing 1510 the face image into a set of triangular regions using Delaunay triangulation, as illustrated in FIG. 4. For consistency, the set of triangular regions may be normalized 1615 in terms of size and camera angle. In embodiments, the canonical camera angle may be a frontal view. In embodiments, a global 2D shape model of an object image may be generated based on the set of control points 1620.

(i) Generating a 3D Shape Model

Figure 17:
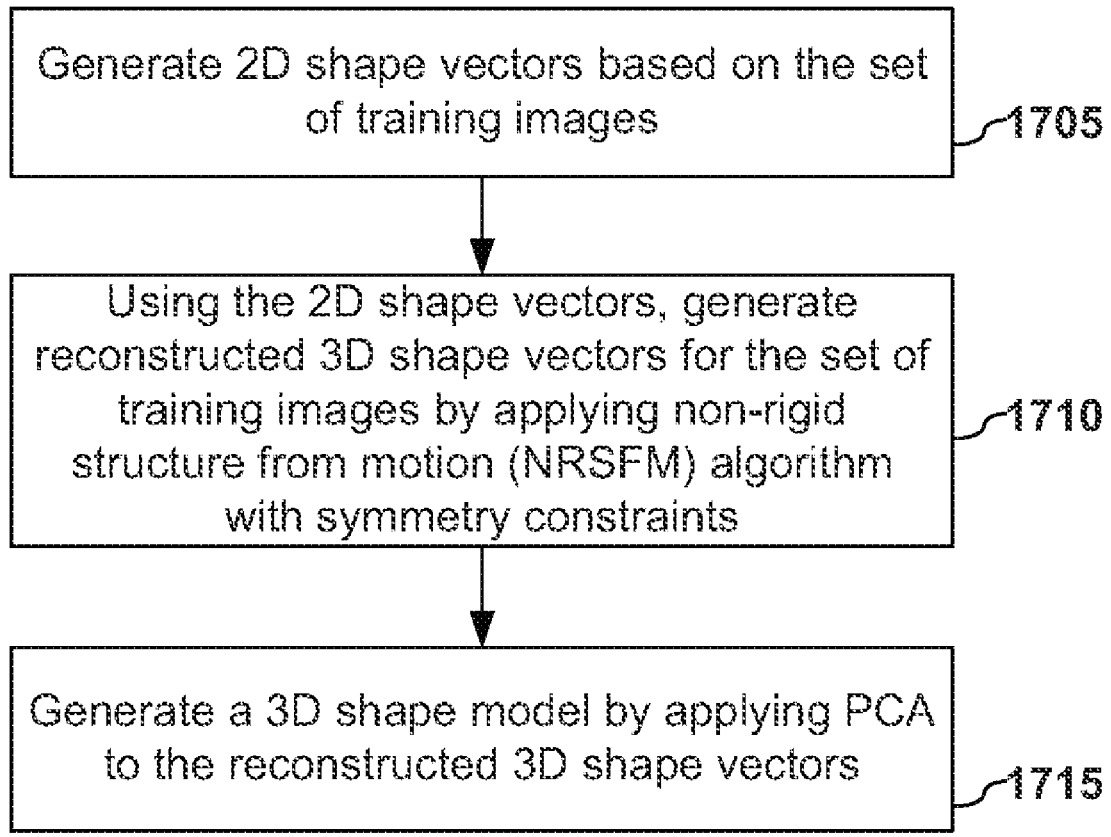
FIG. 17 depicts a method for generating a 3D shape model from a set of object images according to various embodiments of the invention.

FIG. 17 depicts a method 1700 for generating a 3D shape and 3D shape modes for an object according to various embodiments of the invention. In embodiments of method 1500, step 1505 may comprise an implementation of method 1700. Method 1700 may be implemented in embodiments of 3D shape reconstructor and modeler 320.

In embodiments, a 3D shape model may be generated based on a set of 2D shapes 1705 obtained from the meshes generated from the training data set of object images. A 3D shape model based on the identified set of control points on the object (See exemplary FIG. 5) can model object shape deformations. In embodiments, a non-rigid structure from motion (NRSFM) algorithm may be applied to the set of 2D shapes to generate 1710 a set of reconstructed 3D shape modes. As previously described, a set of 2D shapes are obtained from the training data set 205 by performing a shape alignment analysis, such as a Procrustes analysis, on the object images in the training data set 205. In embodiments, PCA may be applied 1715 to the reconstructed set of 3D shape vectors to generate a global object 3D shape model (See Equation (2)).

(a) Generating a Shape Model Having Symmetry Constraints

In embodiments, the accuracy of a 3D shape model may be improved by adding one or more symmetry constraints. For example, in an embodiment, a 3D z-motion (depth) constraint may be added as part of the NRSFM as discussed previously with respect to FIGS. 5 and 6. Symmetry is enforced on the z dimension because this dimension typically is most sensitive to noise but generally does not vary within an image. In embodiments, the symmetry constraint is associated with particular characteristics of an object shape. For example, in embodiments, face subcomponents corresponding to the left eye and the right eye may be set to lie on the same plane, or close to the same plane.

In various embodiments, a symmetry constraint may be applied to a set of F shapes having N points per shape according to the following equation:

$$\min_S \|W - P_C S\|^2 + \sum_{i=1}^{N} K_i \sum_{j=1}^{M} \|a S d_{ij}\|^2 \quad (23)$$

where W is the matrix of 2D points (2F×N), S is the 3D shape eigenvector (3×N), $P_c$ are the scaled rotation matrices (2F×3), i is a facial subcomponent (e.g. mouth corner), j is a pair of points within the facial subcomponent i, $K_i$ is a constraint weight, a is a symmetry dimension, such as a z-dimension (e.g. a=[0 0 1]), and $d_{ij}$ is a vector representing the pair of points ij for which symmetry is being enforced, for example:

$$d_{ij} = \begin{bmatrix} 1 \\ 0 \\ \vdots \\ 0 \\ -1 \\ 0 \\ \vdots \\ 0 \end{bmatrix} \quad (24)$$

FIG. 6 illustrates an exemplary application of symmetry constraints during 3D shape model generation, as previously discussed.

(ii) Generating an Appearance Model

In embodiments, a face appearance model comprising a set of subcomponent appearance models 1505 may be derived from a training data set of face images. Step 1505 may be implemented in embodiments of subcomponent appearance modeler 330.

Figure 18:
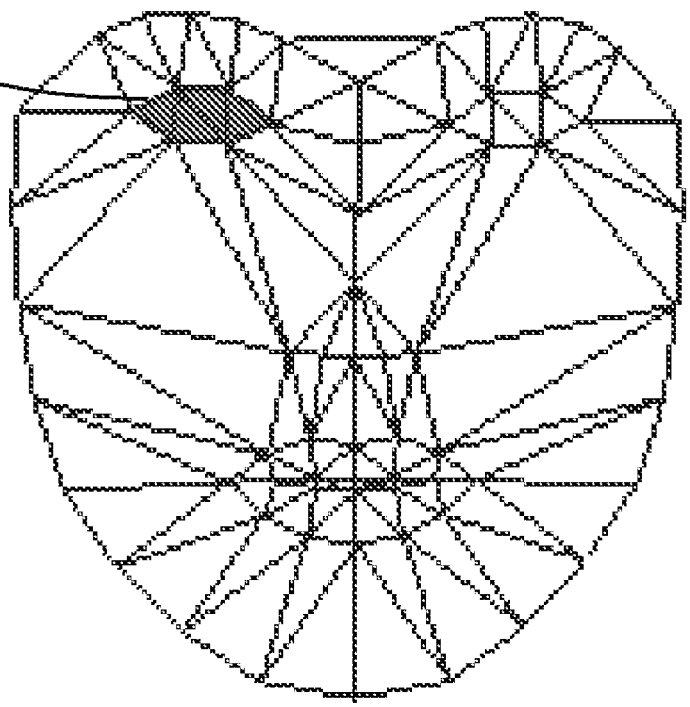
FIG. 18 illustrates an exemplary subdivided face image according to various embodiments of the invention.

In embodiments, the triangular regions may be grouped 1625 into larger regions representing facial subcomponents, such as, for example, the left eye and the nose. FIG. 18 illustrates an exemplary subdivided face image 1800 with a right eye subcomponent 1805 comprising four triangular regions.

An appearance model of each facial subcomponent may be generated. In embodiments, an appearance model I of a subcomponent i may be derived from a training data set of images by extracting a set of linear texture bases capable of representing the subcomponent i in the training data set of images by using Principal Component Analysis (PCA) or the like and generating a linear combination of the bases according to Equation (3), reproduced below:

$$I_i = A_{i0} + \sum_{j=1}^{N_{Ai}} \lambda_{ij} \cdot A_{ij} \quad (3)$$

where $I_i$ is the appearance model of subcomponent i, $A_{i0}$ is the mean subcomponent appearance image of subcomponent i, and $A_{ij}$ and $\lambda_{ij}$ are the $j_{th}$ appearance basis and corresponding projection weight, respectively, of the $i_{th}$ subcomponent for all $N_{Ai}$ bases. In various embodiments, the $i_{th}$ subcomponent may be the global face appearance model. This global face appearance model may be used to model the co-existence of the image subcomponents.

In embodiments, a face appearance model comprising a set of subcomponent appearance models may be derived from the training data set of face images. A set of $N_D$ facial subcomponents is determined, and an $N_D$ set of appearance models is generated as described in Equation (3).

b) Generating a Comprehensive Object Model

In embodiments, a comprehensive 3D AAM face model is generated 1510, comprising a face appearance model formed from a set of face subcomponent appearance models (that may have been generated as described in Equation (3)), which is constrained by a global 3D face shape model (See Equation (2)). A face image appearance model, I, may be expressed according to Equation (4), reproduced here:

$$I = \sum_{i=1}^{N_D} \left( A_{i0} + \sum_{j=1}^{N_{Ai}} \lambda_{ij} A_{ij} \right) \quad (4)$$

where $N_D$ is the number of subcomponents, $N_{Ai}$ is the number of appearance bases for the $i_{th}$ subcomponent, and $\lambda_{ij}$ are the basis projection weights.

In various embodiments, a subcomponent i may be a global face image. This global face appearance model may be used to model the co-existence of the face subcomponents. The global model covers the variations across all the subcomponents together so it is able to smooth boundaries between adjacent subcomponents which may otherwise appear too distinct in a reconstructed face. In embodiments, the set of appearance bases are ortho-normalized when one of the subcomponents is a global face appearance model.

2. A Second Embodiment of a Method for Generating an Object Model

Figure 19:
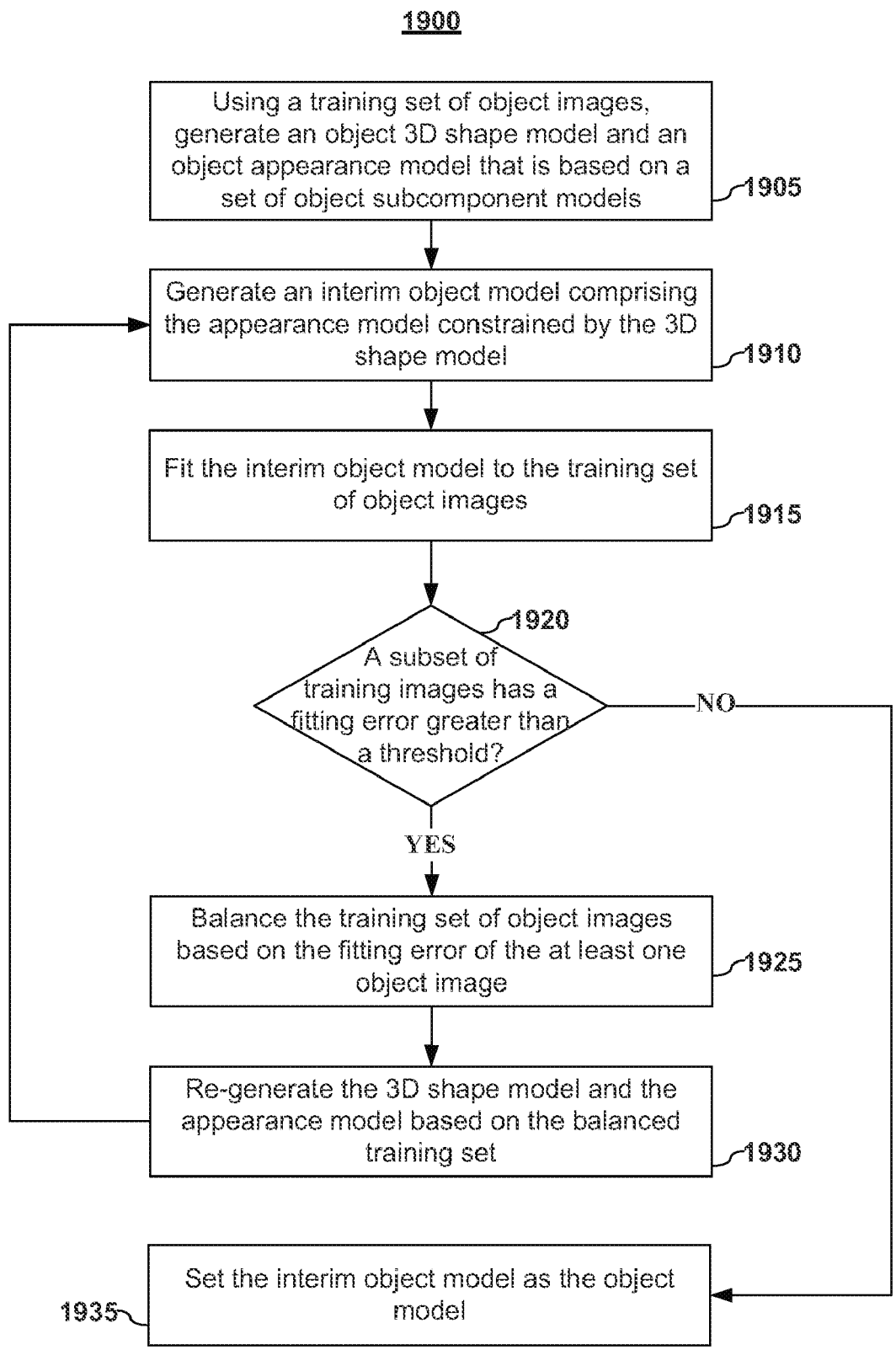
FIG. 19 depicts a method for generating a balanced object model according to various embodiments of the invention.

FIG. 19 depicts a method 1900 for generating a balanced object model according to various embodiments of the invention. Method 1900 may be implemented in embodiments of object model builder 210 comprising mesh generator 310, 3D shape reconstructor and modeler 320, subcomponent appearance modeler 330, and model balancer 710.

a) Model Balancing

As discussed previously, a training data set of object images may be unbalanced, and unbalanced training data may lead to biased eigenvectors for shape and/or texture after PCA is performed. In embodiments, a 3D shape model and an appearance model of an object both are generated 1905 based on a training data set of object images, in the same way as previously described for step 1505 in method 1500.

In embodiments, shape and/or appearance models may be improved by correcting training data set imbalances. Identification and correction of training data set imbalances may be implemented in embodiments of model balancer 710.

In embodiments, an interim object model comprising the generated appearance model constrained by the generated 3D shape model is generated 1910 in the same way as previously described for step 1510 in method 1500. A training data set imbalance may be identified by fitting the interim object model to the training data set object images 1915 and calculating fitting errors for the fitted object images in the training data set. For example, in embodiments, after the $n^{th}$ round of model fitting, if the maximum change in error $\Delta E_{i,n}$ for the $i^{th}$ image, $\max(\Delta E_{i,n})$, divided by the previous maximum error, $\max(E_{i,n-1})$, is greater than a threshold 1920, then the training set remains unbalanced. In embodiments, an exemplary threshold 1920 may be 1-5% of the maximum error.

In embodiments, an unbalanced training data set of face images may be balanced 1925 either by adding more of the face images having fitting errors greater than the threshold to the data set (and increasing the size of the data set), or by weighting the face images having fitting errors greater than the threshold (and keeping the size of the data set constant). In embodiments, weights associated with the overall model fitting error may be computed by combining the shape registration error and the appearance error for an object image. As previously described, in an embodiment, if there are three training images with fitting errors [1000, 2000, 3000], the weights assigned to the images may be computed by dividing the fitting errors by the total registration error, resulting in weights of [⅙, ⅓, ½] for the three training images respectively. Similarly, all fitting errors can be divided by the minimum fitting error and the result can be rounded to get a new set of numbers, [1000, 2000, 3000]/1000=[1 2 3]. These numbers correspond to the number of copies of each image to be included in the training data set. In other embodiments, the number of examples of each type of training image within a data set may be used to perform a single rebalancing of the training data by repeating training samples so that there is an equal number of each type of image within the draining data set. For example, in an embodiment, if there are two training images of type A and one of type B, image B can be repeated in the training data set so that the training data consists of the two original type A images, 1 original type B image, and 1 repeated type B image. Thus, images with larger fitting errors or fewer examples are weighted more.

A new interim object model may be generated 1930 by applying PCA to the balanced training data set, and steps 1915 and 1920 are repeated using the new, re-generated interim model. In various embodiments, the shape and/or appearance models may be weighted and re-trained. In embodiments, if no images in the training data set have fitting errors greater than the threshold 1920, the interim object model is set as the object model 1935.

3. A Third Embodiment of a Method for Generating an Object Model

Figure 20:
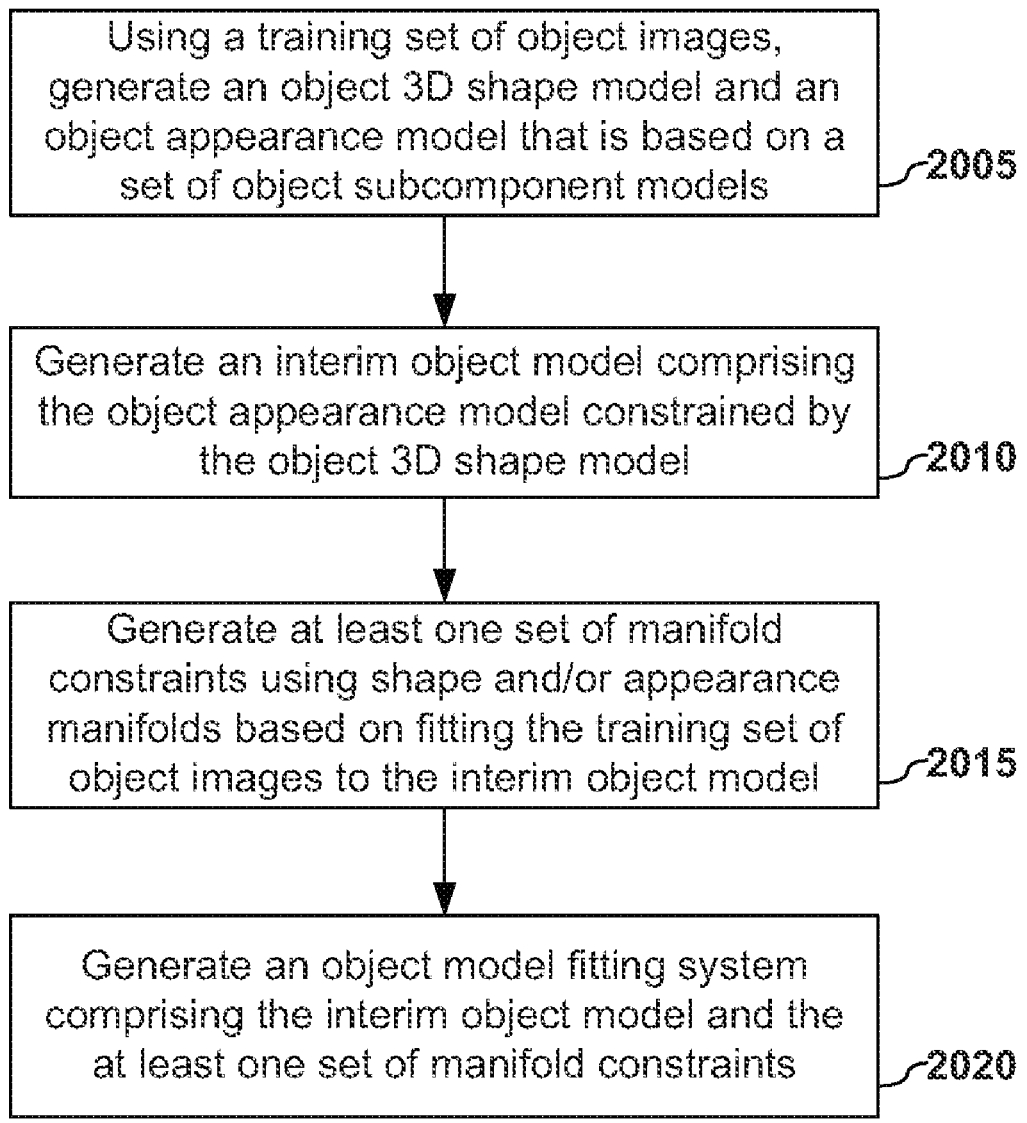
FIG. 20 depicts a method for generating an object model fitting system comprising a manifold constraint according to various embodiments of the invention.

FIG. 20 depicts a method 2000 for generating an object model fitting system comprising an object model and manifold constraints according to various embodiments of the invention. Method 2000 may be implemented in embodiments of object model builder 210 comprising mesh generator 310, 3D shape reconstructor and modeler 320, subcomponent appearance modeler 330, and manifold builder 810.

As previously discussed, the variability of the shape and appearance model parameters may increase as the size of the training data set increases. This increased parameter variability may increase the likelihood of generation of a non-valid reconstructed object image during model fitting when model parameters are updated. In embodiments, model parameter updating may be constrained based on manifolds of shape and/or texture parameter vectors generated from the training data set object images.

In embodiments, a 3D shape model and an appearance model of an object both are generated 2005 based on a training data set of object images, and an object model fitting system comprising an object model comprising the appearance model constrained by the 3D shape model is generated 2010, both in the same way as previously described for steps 1505 and 1510 in method 1500. Shape and/or texture manifolds are generated 2015, and are added 2020 as manifold constraints to the object model fitting system.

a) Generating Shape and Texture Manifolds

In embodiments, shape and texture manifolds are generated 2015 based on the training data set of object images and the generated object model. Step 2015 may be implemented in embodiments of manifold builder 810.

Figure 21:
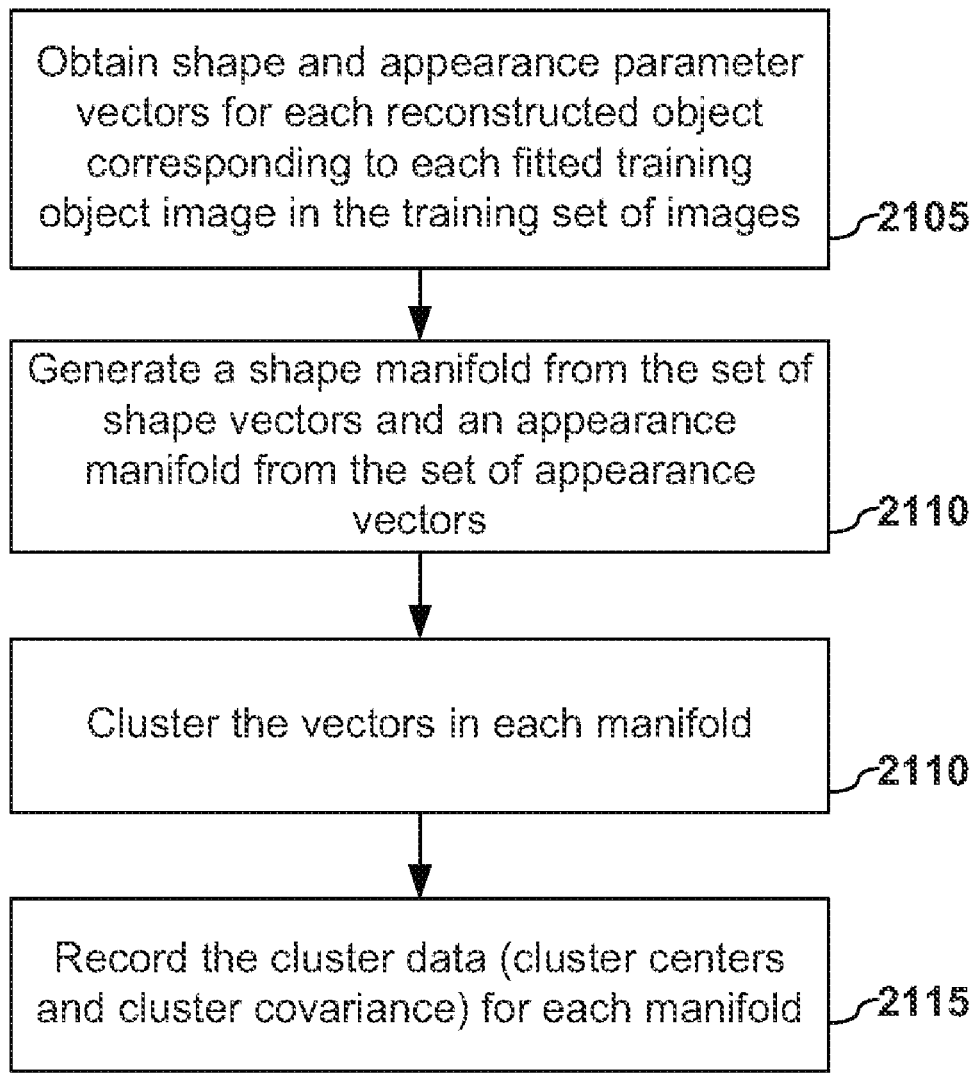
FIG. 21 depicts a method for building shape and texture manifolds according to various embodiments of the invention.

FIG. 21 depicts a method 2100 for building shape and texture manifolds according to various embodiments of the invention. Method 2100 may be implemented in embodiments of step 2015 in method 2000.

In embodiments, a set of shape eigenvectors and a set of appearance eigenvectors are generated by fitting the generated shape and appearance models to the images in the training data set 2005. A shape manifold is built using vectors of shape parameters and a texture manifold is built using vectors of texture parameters 2110.

In embodiments, the vectors within a manifold are clustered 2110 according to a clustering algorithm, such as, for example, K-Means Clustering (K-Means), as previously discussed. Those skilled in the art will recognize that single or multiple clustering techniques are possible for clustering algorithms, and that the choice of application of a particular clustering technique is not critical to the invention.

The cluster centers and respective cluster co-variances determined by the clustering algorithm may provide the basis for manifold constraints 2115. During model fitting, the likelihood of an invalid reconstructed object image generated from the object model is reduced because the updating of shape and texture parameters is constrained based on the distance of these vectors to manifold cluster centers. In embodiments, an optimization fitting function may have a constraint based on the Mahalanobis distance $d_M$ of a parameter vector x to a cluster center according to the equation:

$$d_M(x)=(x-m)'C^{-1}(x-m) \qquad (25)$$

where m is the cluster center and C is the cluster covariance matrix.

In embodiments, the manifold constraints may be included 2020 as terms in the model, such as, for example, a shape constraint:

$$K_S(p-m_S)'C_S^{-1}(p-m_S) \qquad (26)$$

where $K_S$ is a shape constraint weight, p is a shape parameter, $m_S$ is a cluster center in a shape manifold, and $C_S$ is the shape manifold cluster covariance matrix;

and a texture constraint:

$$K_a(\lambda-m_a)'C_a^{-1}(\lambda-m_a) \qquad (27)$$

where $K_a$ is a texture constraint weight, $\lambda$ is a texture parameter, $m_a$ is a cluster center in an texture manifold, and $C_a$ is the texture manifold cluster covariance matrix.

4. A Fourth Embodiment of a Method for Generating an Object Model

Figure 22:
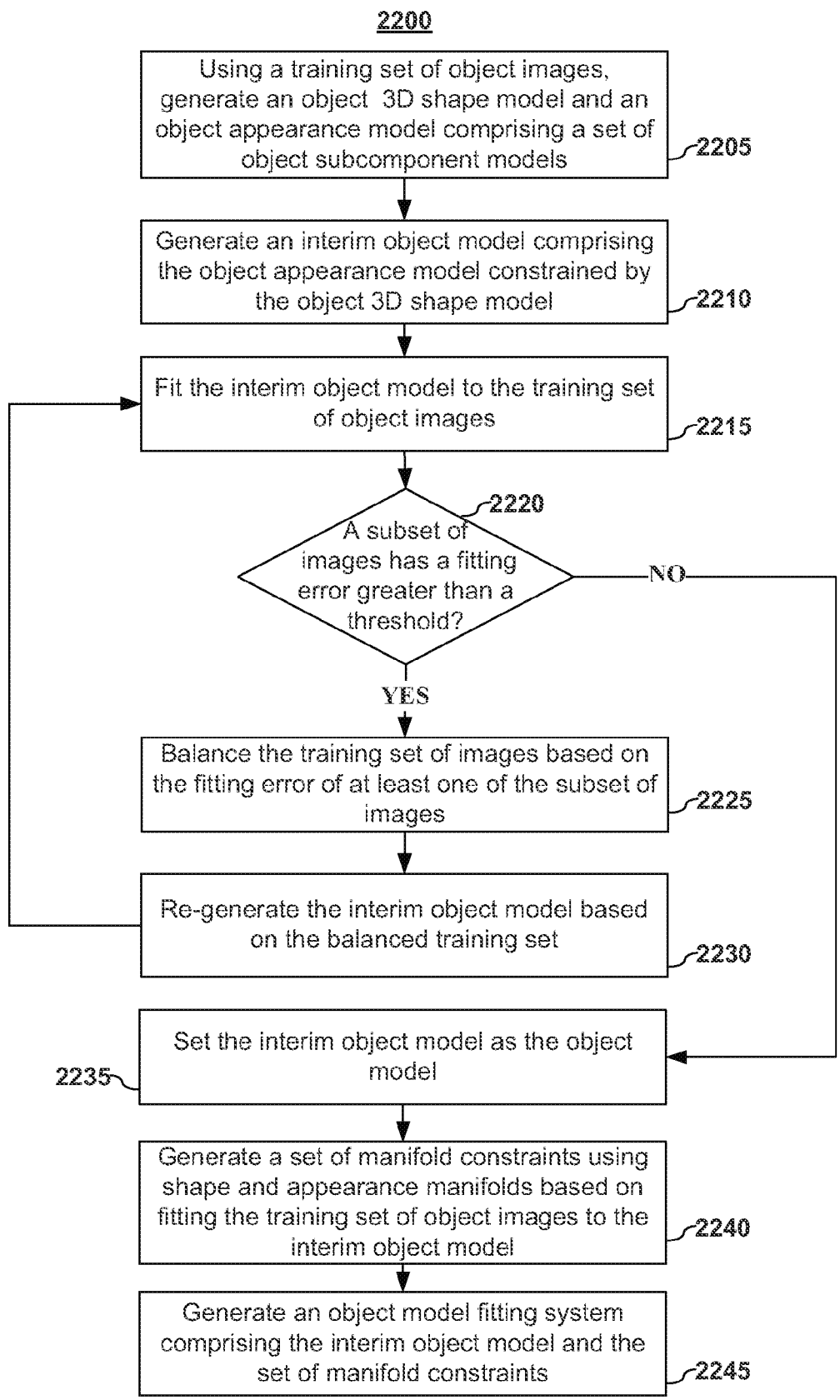
FIG. 22 depicts a method for generating an object model fitting system comprising a balanced model and manifold constraints according to various embodiments of the invention.

FIG. 22 depicts a method 2200 for generating an object model fitting system 345 comprising a balanced model and at least one manifold constraint according to various embodiments of the invention. Method 2200 may be implemented in embodiments of object model builder 210 comprising mesh generator 210, 3D shape reconstructor and modeler 320, subcomponent appearance modeler 330, model balancer 710, and manifold builder 810.

a) Generating appearance and 3D Shape Models

In embodiments, a 3D shape model and an appearance model of an object both are generated 2205 based on a training data set of object images, and an object model comprising the appearance model constrained by the 3D shape model is generated 2210, both in the same way as previously described for steps 1505 and 1510 in method 1500.

b) Model Balancing

In embodiments, steps 2215, 2220, 2225, and 2230 perform identification and correction of training data set imbalances as described for steps 1915, 1920, 1925, and 1930 in method 1900.

c) Generating Shape and Texture Manifolds

In embodiments, shape and texture manifolds are built 2240, and these manifold constraints are added to the object model fitting system 2245 as described for steps 2015 and 2020 in method 2000.

D. Methods for Object Model Fitting

Figure 23:
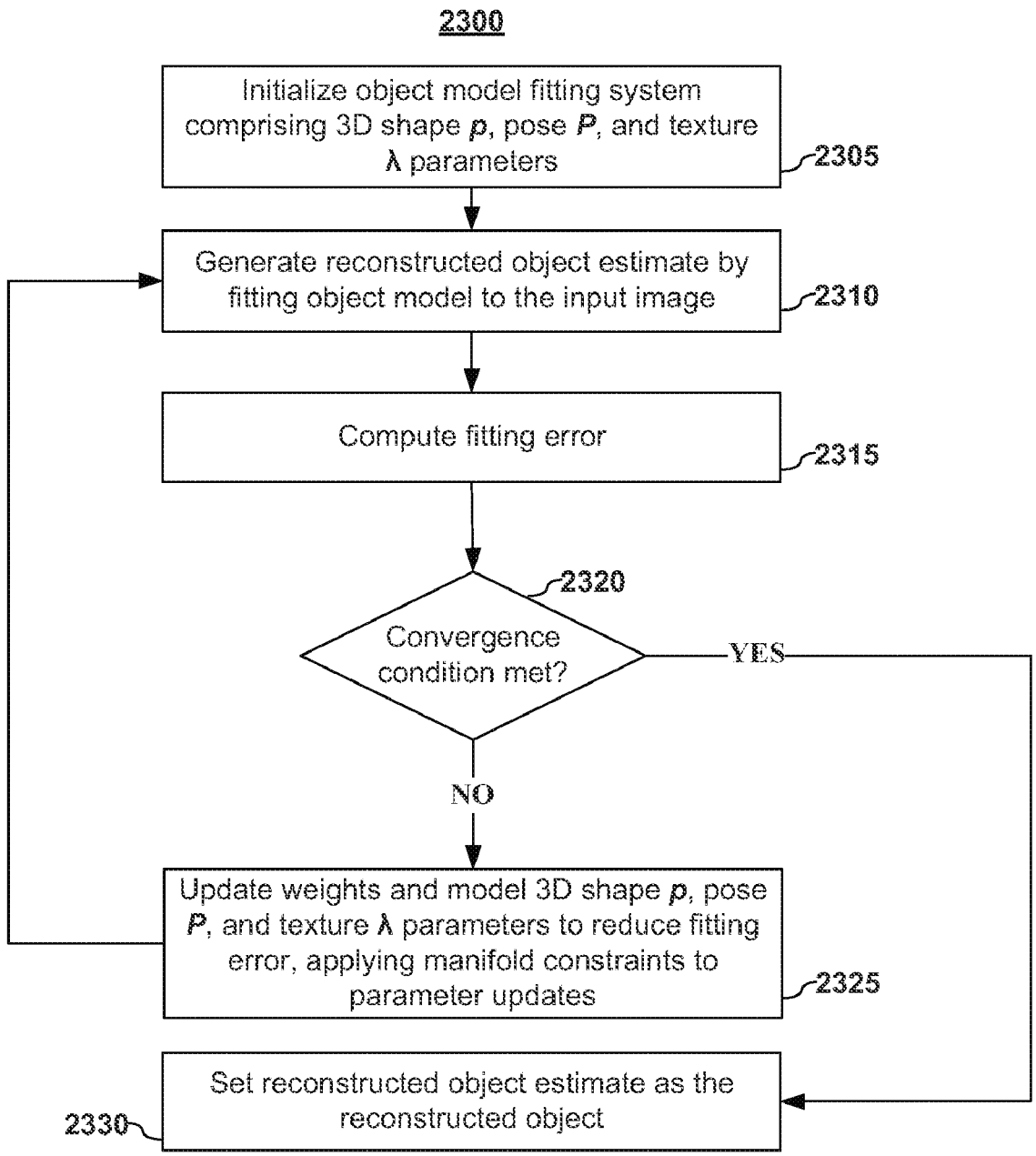
FIG. 23 depicts a method for using an object model fitting system to fit an object model to an input object image according to various embodiments of the invention.

FIG. 23 depicts a method 2300 for fitting an object model to an input object image according to various embodiments of the invention. Method 2300 may be implemented in embodiments of object model fitter 220.

FIG. 12 depicts an exemplary model fitting process according to various embodiments of the invention. In embodiments, an input face image 1210 is fit to a face model 1230 using a face model fitting system by estimating the values of parameters corresponding to 3D face pose, face shape, and facial features of the input face image 1210 that minimize the difference between the model 1230 and the input face image 1210. In embodiments, the face model 1210 may be the appearance model in Equation (4) constrained by the global 3D shape model in Equation (2). In embodiments, minimization is computed by iteratively updating parameter values within a fitting function 1215 as well as associated weights, re-computing a face model estimate, and re-fitting the input face image to the current face model estimate using, by way of illustration and not limitation, the Levenberg-Marquardt (LM) algorithm, which is known to those skilled in the art. Equation (5) is an exemplary fitting function 1215 according to various embodiments of the invention.

Initially, the face model fitting system comprising the face model 3D shape (p), pose (P), and texture ($\lambda$) parameters 1220 are set 2305 to mean values, although other initialization values may be used. In embodiments, the input face image 1210 is warped to canonical view based on the current 3D shape and pose estimate 1205. In embodiments, the canonical view is the frontal view of the image. The current face appearance model estimate 1230 is fitted 2310 to the warped input face image, and a fitting error is computed 2215. If a convergence condition is met 2320, the current face appearance model estimate is set as the reconstructed face 2345. In embodiments, examples of convergence conditions include the fitting error being less than a convergence threshold value and the number of fitting iterations being greater than an upper limit number of iterations. In various embodiments, more than one convergence condition may be applied and convergence is determined based on at least one of the conditions being met.

If a convergence condition is not met 2320, estimates of the model 3D shape (p), pose (P), and texture ($\lambda$) parameters 1220 are updated 2325 based on the computed fitting error.

1. Robust Model Fitting

In embodiments, a face model fitting system may further comprise weighting values, and updating of parameters may also include updating the weighting values. The illustrated current face appearance model estimate 1230 and warped input face image 1235 have been subdivided into six facial subcomponents (left and right eyes, nose, mouth, forehead/brow line, and cheeks/chin area). In embodiments, robust fitting may be implemented by applying a weighting matrix 1225 to features of pixels, regions of pixels, and/or facial subcomponent regions. Registration error weighting may enable robust fitting of the face model to an input face image containing occlusions (e.g., regions with missing data) or other image artifacts (e.g., lens flare). As previously discussed, computation of fitting errors may be used to identify an occluded input face image because the regions corresponding to the occlusion may have relatively larger fitting errors. In embodiments, those regions may be given smaller weights.

FIG. 14 illustrates an exemplary weighting of pixels based on registration error within an occluded face image according to various embodiments of the invention. The exemplary occluded face image 1410 has been subdivided into triangular regions 1420 using Delaunay Triangulation, as previously described. In embodiments, the triangular regions (e.g., 1422 and 1424) within a face subcomponent corresponding to the occluded right eye 1412 of an occluded face image may have larger fitting errors, and thus those regions may be given smaller weights than other regions (e.g., 1426) within the occluded face image. Since, in embodiments, weighting may be done at both a pixel level and a subcomponent level, the pixels in the occluded triangular regions having the greater fitting error (e.g., 1422) may be given lower weights that the pixels in other triangular regions (e.g., 1424) within the occluded subcomponent. In the illustration, the regions within the occluded subcomponent 1412 having the greater fitting error (e.g., 1422) are colored darker than the other regions (e.g., 1424) within the occluded subcomponent.

In embodiments, pose-based pixel weighting may be applied so that higher weights are given to pixels most directly facing the camera. FIG. 13 illustrates an exemplary computation of pose-based weighting of pixels within subdivisions of a face image according to various embodiments of the invention. The exemplary face image 1305 has been subdivided into triangular regions using Delaunay Triangulation, as previously described, and the camera axis 1315 (relative position of the camera 1310) for each triangle is diagramed. In embodiments, the normal vector 1325 for each triangle is computed, and the angle $\theta$ 1320 between the normal vector and the camera axis is computed. In embodiments, pose-based model weights for the triangular regions may be based on a distribution of the computed angle $\theta$ of the normal vectors according to Equation (17), reproduced here:

$$1-(\min(\theta,\pi/2)*2/\pi)^4 \qquad (17)$$

Because the pose and shape parameters and mesh define a 3D shape mesh comprising triangles/subdivisions, each triangle in the 3D shape mesh may have a normal direction. The angles between the normals and the camera axis in the 3D shape mesh can be used to update the weights. Thus, pose and shape parameters affect the weights because they are used to determine the 3D shape, but, in embodiments, the weights are computed based on the computed angle $\theta$ of the normal vectors, as described. In embodiments, pose-based weights may be updated by determining an angle for a triangle. All pixels in the mesh triangle may be associated with the same angle or a normal angle may be interpolated at each pixel in the triangle. A subcomponent of the object can be formed from a plurality of triangles and/or portions thereof, and the pose-based weight associated with the subcomponent may be computed by averaging the angles associated with the pixels that form the subcomponent. For example, in embodiments, the normal angle for a subcomponent may be computed by averaging the angles associated with pixels that form the subcomponent.

2. Inverse Compositional Model Fitting Method

Figure 24:
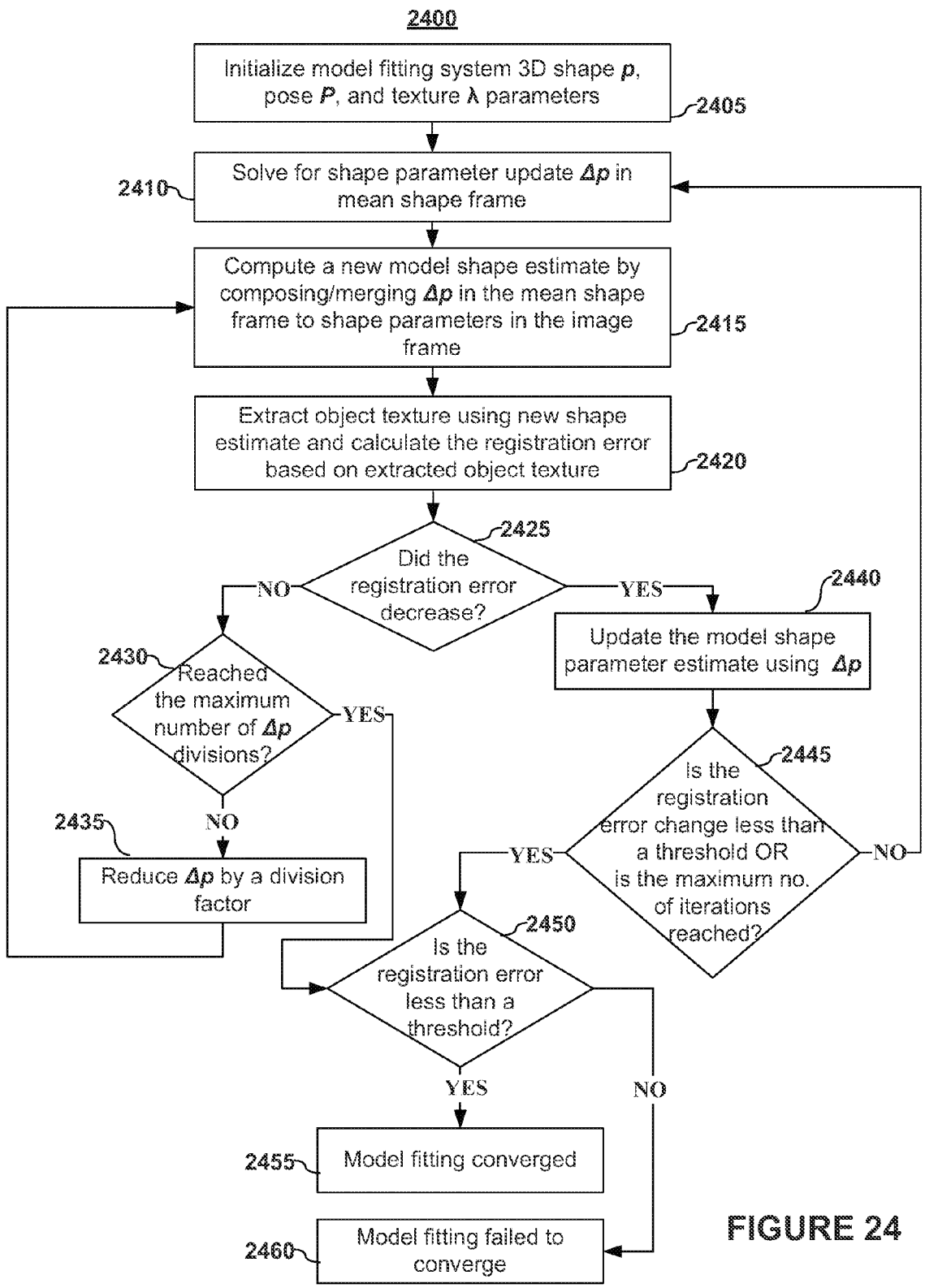
FIG. 24 depicts a method for an inverse compositional fitting of an object model to an input object image according to various embodiments of the invention.

FIG. 24 depicts a method 2400 for an inverse compositional fitting of an object model to an input object image according to various embodiments of the invention. Method 2400 is an embodiment of method 2300 that is based on an inverse compositional solution fitting function (e.g., objective function 1215 in FIG. 12) that determines reconstructed texture ($\lambda$) parameters based on solving for the minimized update to the shape parameters $\Delta p$ in the image frame and then computing texture reconstruction $A(\lambda)$ according to Equations (6) and (7), reproduced here:

$$\min_{\lambda,\Delta p} W\|T(A(\lambda);\Delta p)-T(I;p)\|^2 \qquad (6)$$

$$A(\lambda)=A_0+\sum_{i=1}^{N_a} A\lambda \qquad (7)$$

Initially, the model 3D shape (p), pose (P), and texture ($\lambda$) parameters 1220 are set 2405 to mean values, although one skilled in the art shall recognize that other values may be used to initialize the parameters.

The shape parameter update Δp in the mean shape frame may be calculated 2410 according to Equation (8), reproduced here:

$$\Delta p = R \cdot E \quad (8)$$

where R is a shape parameter update matrix and E is a weighted registration error vector $E=(A_0-I)$ where $A_0$ is the mean appearance and I is the current reconstructed image estimate.

In embodiments, $R=-(SD'WSD)^{-1}SD'W$ and SD is a $P_S \times N$ steepest descent matrix of shape eigenvectors ($P_S$ is the number of shape modes and N is the number of pixels) to a gradient of appearance means according to the equation:

$$SD = \left(\nabla A_0 \frac{\partial W}{\partial p}\right) \quad (19)$$

Thus, Δp may be also be written as $\Delta p = -(SD'WSD)^{-1} SD'W(A_0-I)$. It should be noted that if W is constant, then R does not change and may be pre-computed. In embodiments, as discussed herein, different weightings can be applied via the weighting matrix, W.

A new shape estimate p is computed 2415 by merging Δp into the shape parameters in the image frame (1235 in FIG. 12) according to Equations (9), (10), (11), and (12), reproduced here:

$$S_{shape} = T(S_0; p) + T(S_0; -\Delta p) \quad (9)$$
$$\min \|S_{shape} - (S_o + S(p - \Delta\hat{p}))\|^2 \quad (10)$$
$$\Delta\hat{p} = -(I)^{-1}S'W(S_{shape} - (S_0 + Sp)) \quad (11)$$
$$p = p_0 - \Delta\hat{p} \quad (12)$$

That is, $S_{shape}$ is determined, where $S_{shape}$ is the mean shape ($S_0$) warped by the shape parameter update, −Δp, and then warped to the image frame by the current shape parameters, p, $T(S_0;p)$ is the current shape estimate, $T(S_0; -\Delta p)$ is the delta shape, and where S is the set of shape eigenvectors, S' is the transpose of S, $S_p$ is the modified set of shape eigenvectors, I is the set of image texture eigenvectors, and W is a weighting matrix. Note that T(x,y) defines a warping of the shape, x, by the parameters, y. The shape update, $\Delta\hat{p}$, in the image frame may be determined according to the Equations (10) and (11). It should be noted that in this embodiment no weighting matrix is implemented here because for the shape vectors. However, one skilled in the art shall recognize that the shape model could be weighted. The updated shape parameters p in the image frame may be computed using the previous best shape parameters, and $\Delta\hat{p}$, according to Equation (12). The best shape parameters are the parameters from the previous iteration that resulted in the lowest registration error.

The registration error vector E is calculated 2420 based on the image texture λ that has been extracted from the image frame which has been updated based on p. The image texture λ may be computed according to Equations (14) and (15), reproduced here:

$$\min_\lambda W\|A_o + A\lambda - T(I; p)\|^2 \quad (14)$$

$$\lambda = -(A'WA)^{-1}A'W(A_o - T(I; p)) \quad (15)$$

and then E may be computed according to Equation (16), reproduced here:

$$E = A_0 + \sum_{i=1}^{N_{Ai}} A\lambda - I \quad (16)$$

In embodiments, the value of $\Delta\hat{p}$ may not have produced a decrease in the registration error vector E. If E did not decrease 2425, the value of $\Delta\hat{p}$ may be reduced 2435 by dividing it by a division factor, such as, for example, a factor of 2:

$$\Delta\hat{p} = \frac{\Delta\hat{p}}{2} \quad (28)$$

and then computing a new registration error vector E (steps 2415 and 2420) using the reduced $\Delta\hat{p}$. If E did not decrease 2425, steps 2435, 2415, and 2420 may be repeated until a predetermined maximum number of $\Delta\hat{p}$ reductions has been made 2430.

If a decrease in the registration error vector E occurs 2425, the shape parameter estimate p is set. If the decrease in E is greater than a threshold or a predetermined maximum number of iterations has not been reached 2445, a new shape parameter estimate p is iteratively computed (steps 2410 through 2440).

If the decrease in E is less than the threshold or the predetermined maximum number of iterations has been reached 2445, or if the maximum number of reductions of the value of $\Delta\hat{p}$ have been made 2430, the value of E is compared to a threshold value 2450. If E is less than a threshold 2455, model fitting has converged. If E is greater than the threshold 2460, model fitting has failed to converge.

3. Object Model Fitting With Manifold Constraints

FIG. 25 depicts a method 2500 for applying a manifold constraint according to various embodiments of the invention. Method 2500 may be implemented in embodiments of step 2325 of method 2300.

In embodiments, identification 2505 of the nearest manifold cluster to a parameter vector x may be based on the Mahalanobis distance of the parameter vector x to a cluster center according to Equation (25), as previously described. In embodiments, manifold constraints may be applied 2510 to the update of the parameter vector x based on the distance to the nearest manifold cluster center as described in Equations (26) and (27).

In embodiments, shape and appearance manifold constraints may be applied along with a fitting function (such as, for example, the fitting function exemplified in Equation (5)), such as in the equation:

$$\min_{\lambda,p,P} W\left[\sum_{i=1}^{N_D}\left(A_{i0} + \sum_{j=1}^{N_{Ai}} \lambda_{ij} A_{ij}\right) - T(I; p, P)\right]_2^2 + \quad (29)$$
$$K_s(p-m_s)'C_s^{-1}(p-m_s) + K_a(\lambda-m_a)'C_a^{-1}(\lambda-m_a)$$

where $K_S$ is a shape constraint weight, $m_S$ is a cluster center in a shape manifold, and $C_S$ is the shape manifold cluster covariance matrix, and where $K_a$ is a texture constraint weight, $m_a$ is a cluster center in an texture manifold, and $C_a$ is the texture manifold cluster covariance matrix.

In embodiments of method 2400, the solution for a shape parameter update Δp (See Equations (10) and (11)) may include shape manifold constraints such as in the equations:

$$\min_{\Delta p} \|S_{shape} - (S_o + S(p - \Delta \hat{p}))\|^2 + \quad (30)$$
$$K_s[(p + \Delta \hat{p} - m_{s_s})' C_{s_s}^{-1}(p + \Delta \hat{p} - m_{s_s})]$$

$$\Delta \hat{p} = -(I + K_s C_{s_s}^{-1})^{-1} S' W (S_{shape} - (S_0 + Sp)) - \quad (31)$$
$$K_s (I + K_s C_{s_s}^{-1})^{-1} C_s^{-1}(p - m_s)$$

In embodiments of method 2400 in which shape reconstruction is weighted, manifold constraints also may be applied, such as in the equation:

$$\Delta \hat{p} = -(S'WS + K_s C_{s_s}^{-1})^{-1} S'W(S_{shape} - (S_0 + Sp)) - K_s (S'WS + K_s C_s^{-1})^{-1} C_{s_s}^{-1}(p - m_s) \quad (32)$$

In embodiments of method 2400, the solution for an extracted texture parameter λ (See Equations (14) and (15)) may include texture manifold constraints such as in the equations:

$$\min_{\lambda} W\|A_o + A\lambda - T(I; p)\|^2 + K_a[(\lambda - m_a)' C_{a_t}^{-1}(\lambda - m_{a_t})] \quad (32)$$

$$\lambda = -(A'WA + K_a C_{a_t}^{-1})^{-1} A'W(A_o - T(I; p)) + \quad (33)$$
$$K_a (A'WA + K_a C_a^{-1})^{-1} C_a^{-1} m_a$$

E. Computing System Implementations

It shall be noted that the present invention may be implemented in any instruction-execution/computing device or system capable of processing the image data, including without limitation, a general-purpose computer and a specific computer, such as one intended for graphics processing. The present invention may also be implemented into other computing devices and systems, including without limitation, a digital camera, a printer, a scanner, a multiple function printer/scanner, a facsimile machine, a multimedia device, and any other device that processes, captures, transmits, or stores an image. Furthermore, within any of the devices, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 26:
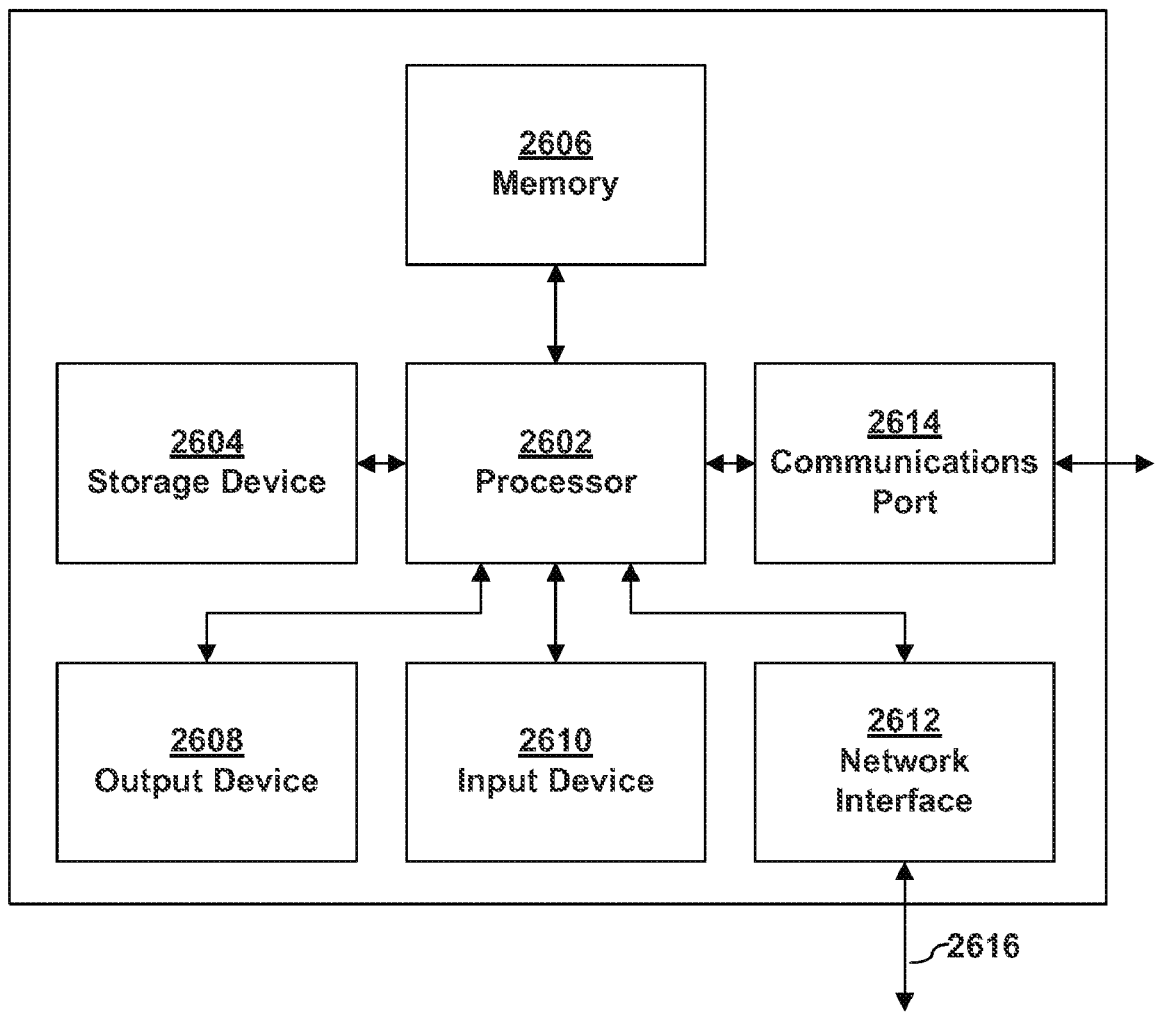
FIG. 26 depicts a block diagram of a computing system according to various embodiments of the invention.

FIG. 26 depicts a functional block diagram of an embodiment of an instruction-execution/computing device 2600 that may implement or embody embodiments of the present invention. As illustrated in FIG. 26, a processor 2602 executes software instructions and interacts with other system components. In an embodiment, processor 2602 may be a general purpose processor such as (by way of example and not limitation) an AMD processor, an INTEL processor, a SUN MICROSYSTEMS processor, or a POWERPC compatible-CPU, or the processor may be an application specific processor or processors. A storage device 2604, coupled to processor 2602, provides long-term storage of data and software programs. Storage device 2604 may be a hard disk drive and/or another device capable of storing data, such as a computer-readable media (e.g., diskettes, tapes, compact disk, DVD, and the like) drive or a solid-state memory device. Storage device 2604 may hold programs, instructions, and/or data for use with processor 2602. In an embodiment, programs or instructions stored on or loaded from storage device 2604 may be loaded into memory 2606 and executed by processor 2602. In an embodiment, storage device 2604 holds programs or instructions for implementing an operating system on processor 2602. In one embodiment, possible operating systems include, but are not limited to, UNIX, AIX, LINUX, Microsoft Windows, and the Apple MAC OS. In embodiments, the operating system executes on, and controls the operation of, the computing system 2600.

An addressable memory 2606, coupled to processor 2602, may be used to store data and software instructions to be executed by processor 2602. Memory 2606 may be, for example, firmware, read only memory (ROM), flash memory, non-volatile random access memory (NVRAM), random access memory (RAM), or any combination thereof. In one embodiment, memory 2606 stores a number of software objects, otherwise known as services, utilities, components, or modules. One skilled in the art will also recognize that storage 2604 and memory 2606 may be the same items and function in both capacities. In an embodiment, one or more of the components of FIGS. 2, 3, 7, 8, 10, and 11 may be modules stored in memory 2604, 2606 and executed by processor 2602.

In an embodiment, computing system 2600 provides the ability to communicate with other devices, other networks, or both. Computing system 2600 may include one or more network interfaces or adapters 2612, 2614 to communicatively couple computing system 2600 to other networks and devices. For example, computing system 2600 may include a network interface 2612, a communications port 2614, or both, each of which are communicatively coupled to processor 2602, and which may be used to couple computing system 2600 to other computer systems, networks, and devices.

In an embodiment, computing system 2600 may include one or more output devices 2608, coupled to processor 2602, to facilitate displaying graphics and text. Output devices 2608 may include, but are not limited to, a display, LCD screen, CRT monitor, printer, touch screen, or other device for displaying information. Computing system 2600 may also include a graphics adapter (not shown) to assist in displaying information or images on output device 2608.

One or more input devices 2610, coupled to processor 2602, may be used to facilitate user input. Input device 2610 may include, but are not limited to, a pointing device, such as a mouse, trackball, or touchpad, and may also include a keyboard or keypad to input data or instructions into computing system 2600.

In an embodiment, computing system 2600 may receive input, whether through communications port 2614, network interface 2612, stored data in memory 2604/2606, or through an input device 2610, from a scanner, copier, facsimile machine, or other computing device.

One skilled in the art will recognize no computing system is critical to the practice of the present invention. One skilled in the art will also recognize that a number of the elements described above may be physically and/or functionally separated into sub-modules or combined together.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

What is claimed is:

1. A computer-readable medium carrying one or more sequences of instructions, wherein execution of the one or more sequences of instructions by one or more processors causes the one or more processors to fit an input image to an object model by performing the steps comprising:
   [a] using a object model fitting system comprising a set of weights, at least one set of manifold constraints, and a three-dimensional (3D) object active appearance model (AAM) comprising a 3D object shape model that receives shape parameter values and pose parameter values and an object appearance model comprising a set of object subcomponent appearance models that receive appearance parameter values, to generate a first image and a second image,
      the first image being generated using the 3D object shape model, the input image, the shape parameter values, and pose parameter values to generate the first image from the input image; and
      the second image being generated using the object appearance model and appearance parameter values to generate the second image;
   [b] calculating a set of fitting errors representing a difference between the first image and the second image;
   [c] responsive to a stop condition not being satisfied:
      updating at least some of weights in the set of weights using at least some of the shape and pose parameter values;
      updating at least some of the shape, pose, and appearance parameter values using at least some of the set of errors and the at least one set of manifold constraints; and
      returning to step [a].

2. The computer-readable medium of claim 1 wherein the input image is an image comprising a face and the 3D object AAM models shape and appearance deformations across faces.

3. The computer-readable medium of claim 1 wherein the set of fitting errors comprise registration errors, and fitting the input image to the 3D object AAM is performed by an inverse compositional method comprising finding an optimal 3D shape parameter update.

4. The computer-readable medium of claim 1 wherein the step of updating at least some of weights in the set of weights using at least some of the shape and pose parameter values comprises:
   dividing the first image into a set of subdivisions, wherein a subdivision comprises one or more pixels;
   using the at least some of the shape and pose parameter values to determine angles for at least some of the subdivision in the first image, an angle being determined as the angle between a normal vector from a subdivision in the first image and a camera axis to the subdivision; and
   updating at least some of the set of weights in relation to at least some of the angles.

5. The computer-readable medium of claim 4 wherein updating at least some of the set of weights in relation to at least some of the angles comprises assigning a weight to a region, the weight being inversely related to the size of an angle associated with that region.

6. The computer-readable medium of claim 5 wherein the region is a subdivision.

7. The computer-readable medium of claim 5 wherein the region is formed using one or more subdivisions and the angle associated with the region is obtained using the angles associated with the one or more subdivisions.

8. The computer-readable medium of claim 4 wherein the set of errors comprises registration errors and updating at least some of weights in the set of weights further comprises using at least some of the registration errors to update the set of weights.

9. The computer-readable medium of claim 1 wherein the at least one set of manifold constraints are generated using an appearance manifold formed using appearance parameters associated with the object appearance model and using a shape manifold formed using shape parameters associated with the 3D object shape model.

10. The computer-readable medium of claim 9 wherein a manifold constraint is associated with a distance of a model parameter vector instance to a cluster center within a manifold, the manifold comprising a set of model parameter vector instances obtained by fitting a training set of images to an interim object AAM comprising the 3D object shape model and the object appearance model.

11. The computer-readable medium of claim 10 wherein a cluster analysis is applied to the set of model parameter vector instances to obtain a set of cluster centers and a set of cluster co-variances associated with the set of cluster centers, and the cluster center is from the set of cluster centers.

12. A computer-readable medium carrying one or more sequences of instructions, wherein execution of the one or more sequences of instructions by one or more processors causes the one or more processors to form an object model fitting system based on a set of training images by performing the steps comprising:
   [a] generating a balanced object model by:
      [a1] generating a three-dimensional (3D) object shape model comprising shape parameters, the 3D object shape model based on the set of training images;
      [a2] generating a object appearance model comprising a linear combination of a set of subcomponent object appearance models comprising texture parameters, the object appearance model based on the set of training images;
      [a3] forming an interim object model comprising the 3D object shape model and the object appearance model;
      [a4] for each object image in a set of images selected from the set of training images, generating an object model estimate by fitting the object image to the interim object model, and calculating a fitting error between the object image and the object model estimate; and
      [a5] responsive to identifying a subset of training images having associated fitting errors that are larger than an error threshold value, balancing the set of training images based on the associated fitting errors and returning to step [a1]; and

[a5] responsive to identifying no subset of training images having associated fitting errors that are larger than an error threshold value, setting the interim object model as the balanced object model; and using the balanced object model to generate at least one set of manifold constraints associated with a manifold, the manifold based on a vector of a type of model parameters, the type of model parameters comprising shape and texture; and forming the object model fitting system comprising the balanced object model and the at least one set of manifold constraints.

13. The computer-readable medium of claim 12 wherein using the balanced object model to generate a least one set of manifold constraints associated with a manifold comprises:

obtaining a set of model parameter vector instances by:
for each image from a set of images selected from the set of training images, fitting an image to the balanced object model to obtain a reconstructed object image instance;
extracting a model parameter vector instance from the reconstructed object image instance; and
adding the model parameter vector instance to the set of model parameter vector instances;

forming the manifold using the set of model parameter vector instances; and generating a set of manifold constraints by applying a cluster analysis to the set of model parameter vector instances.

14. The computer-readable medium of claim 13 wherein generating the set of manifold constraints is based on a set of cluster centers and a set of cluster co-variances associated with the set of cluster centers.

15. The computer-readable medium of claim 14 wherein the cluster analysis is K-Means clustering.

16. The computer-readable medium of claim 12 wherein balancing the set of training images comprises increasing the size of the set of training images by adding a second set of images to the set of training images, each of the second set of images having at least some of the characteristics of the subset of training images.

17. The computer-readable medium of claim 16 wherein balancing the set of training images comprises weighting at least some of the images within the set of training images.

18. The computer-readable medium of claim 17 wherein weighting at least some of the images comprises assigning weights in relation to fitting errors associated with the at least some of the images.

19. A system for forming a reconstructed object image from an input image comprising pixels, the system comprising:

an object model fitter, coupled to receive the input image, that forms the reconstructed object image by fitting the input image to an object fitting system comprising a set of weights, at least one set of manifold constraints, and a three-dimensional (3D) object active appearance model (AAM) comprising a 3D object shape model that receives shape parameter values and pose parameter values and an object appearance model comprising a set of object subcomponent appearance models that receive appearance parameter values, the object model fitter comprising:

a reconstructed object estimator, coupled to receive the input image, the set of weights, the 3D AAM, 3D shape parameter values, pose parameter values, and appearance parameter values, that generates a first image using the 3D object shape model, the input image, the shape parameter values, and the pose parameter values, and that generates a second image obtained using the object appearance model, at least some of the set of weights, and the appearance parameter values; and a reconstructed object updater, coupled to receive the first and second images, that calculates a set of fitting errors representing a difference between the first and second images, and updates at least some of weights in the set of weights using at least some of the pose parameter values, and updates at least some of the shape, pose, and appearance parameter values using at least some of the set of errors and the at least one set of manifold constraints.

20. The system of claim 19 further comprising an object model builder, coupled to receive a set of training images, that forms the 3D AAM and at least one manifold based on the set of training images.

21. The system of claim 20 wherein the object model builder comprises:

a 3D shape reconstructor and modeler, coupled to receive a set of shapes obtained from a set of labeled feature points in the set of training images, that forms the 3D object shape model based on the set of shapes;

a subcomponent appearance modeler, coupled to receive the set of training images, that forms the set of object subcomponent appearance models using the set of training images; and a manifold builder, coupled to receive instances of at least one parameter type obtained using the 3D AAM and at least some of the set of training images, that builds a manifold using the instances of the at least one parameter type.

* * * * *